(12) United States Patent
Ueno

(10) Patent No.: US 7,764,580 B2
(45) Date of Patent: Jul. 27, 2010

(54) DEMODULATOR

(75) Inventor: Keishi Ueno, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 945 days.

(21) Appl. No.: 11/580,643

(22) Filed: Oct. 12, 2006

(65) Prior Publication Data

US 2007/0091771 A1 Apr. 26, 2007

(30) Foreign Application Priority Data

Oct. 24, 2005 (JP) ............................. 2005-308439
Oct. 24, 2005 (JP) ............................. 2005-308447

(51) Int. Cl.
*G11B 19/02* (2006.01)

(52) U.S. Cl. .................................................. 369/47.19

(58) Field of Classification Search ....................... None
See application file for complete search history.

(56) References Cited

U.S. PATENT DOCUMENTS

| | | | |
|---|---|---|---|
| 6,999,391 B2 * | 2/2006 | Heemskerk et al. ...... | 369/53.34 |
| 7,099,244 B2 * | 8/2006 | Nakata et al. ............ | 369/47.19 |
| 2004/0145981 A1 | 7/2004 | Mashimo | |
| 2004/0156291 A1 | 8/2004 | Heemskerk et al. | |
| 2005/0047296 A1 | 3/2005 | Georgi | |
| 2007/0025202 A1* | 2/2007 | Huh et al. ................ | 369/44.13 |

FOREIGN PATENT DOCUMENTS

| | | |
|---|---|---|
| JP | 2003-123249 | 4/2003 |
| JP | 2003-123267 | 4/2003 |
| JP | 2004-227625 | 8/2004 |
| JP | 2005-071579 | 3/2005 |

* cited by examiner

*Primary Examiner*—Joseph H Feild
*Assistant Examiner*—Parul Gupta
(74) *Attorney, Agent, or Firm*—Seed IP Law Group PLLC

(57) ABSTRACT

HMW demodulation is effected more reliably with a simple configuration. A reproduced wobble signal is caused to pass through a BPF previously set to a center frequency 2fwob, to thus enhance a second harmonic component. The wobble signal having passed through a BPF is multiplied by a second harmonic signal. Subsequently, a peak envelope signal and a bottom envelope signal of the multiplied wobble signal are extracted. The peak envelope signal is discriminated from the first preset threshold value. A result of this discrimination becomes a signal used for detecting an HMW[1] wobble waveform. Similarly, a bottom envelope signal is discriminated from a preset second threshold value. The result of discrimination becomes a signal used for detecting an HMW [0] wobble waveform.

5 Claims, 20 Drawing Sheets

US 7,764,580 B2

DEMODULATOR

PRIORITY INFORMATION

This application claims priority to Japanese Patent Application Nos. 2005-308439 and 2005-308447 filed on Oct. 24, 2005, which are incorporated herein by reference in their entireties.

BACKGROUND OF THE INVENTION

1. Technical Field

The present invention relates to a demodulator for demodulating digital information from an HMW-modulated or MSK-modulated wobble signal.

2. Related Art

A scheme for embedding digital information, such as address information, on an optical disk into a wobble signal of the optical disk has hitherto been adopted. In some optical disks typified by a Blu-ray disk, digital information is embedded through combined use of an MSK modulation scheme and an HMW modulation scheme. According to the MSK modulation scheme, frequency modulation is effected through use of two frequencies; namely, a frequency equal to the frequency of a reference carrier signal, and a frequency 1.5 times the frequency of the reference carrier signal. Consequently, provided that a reference carrier signal is represented as $\cos(\omega t)$, binary digit "0" is represented by $\cos(\omega t)$, or $-\cos(\omega t)$, which is the inverse thereof. Binary digit "1" is represented by $\cos(1.5\omega t)$, or $-\cos(1.5\omega t)$, which is the inverse thereof. An MSK modulation mark is made up of three carrier periods $\cos(1.5\omega t)$, $-\cos(\omega t)$, and $-\cos(1.5\omega t)$. According to the HMW modulation scheme, modulation is effected by means of adding or subtracting a harmonic signal of an even order (e.g., a second order) to or from a sinewave carrier signal in accordance with the sign of data to be modulated.

A plurality of techniques of demodulating digital information from the thus MSK-modulated or HMW-modulated wobble signal have hitherto been proposed. For instance, a demodulation scheme called a heterodyne scheme is described in Japanese Patent Laid-Open Publication No. 2003-123249. According to this scheme, when an HMW-modulated signal is demodulated, a harmonic signal of an even order and a data clock signal are generated from a reproduced wobble signal. The reproduced wobble signal is multiplied by the thus-generated harmonic signal of the even order, thereby acquiring a signal. The thus-acquired signal is summed on a per-data-clock-signal basis. A sign of address information is determined on the basis of a summed value acquired at the end edge of the data clock signal. When an MSK-modulated signal is demodulated, the wobble signal is multiplied by a reference clock signal in lieu of a harmonic signal.

However, the technique described in connection with Japanese Patent Laid-Open Publication No. 2003-123249 encounters a problem of insufficient reliability of a demodulation result. Specifically, in relation to a carrier signal, a harmonic component contained in a wobble signal is usually −12 dB or thereabouts. There may arise a case where a second harmonic component becomes unstable because of variations in manufacture of an optical disk or the influence of crosstalk from adjacent tracks, thereby posing difficulty in detection of a harmonic component and disabling demodulation of digital information. The same also applies to MSK modulation. According to the technique described in connection with Japanese Patent Laid-Open Publication No. 2003-123249, a demodulation circuit must be equipped with a multiplier, an integrator, or the like, and, hence, is liable to structural complication and cost hike.

Accordingly, the present invention provides a demodulator and an optical disk apparatus, which enable more accurate demodulation of digital information from an HMW-modulated or MSK-modulated wobble signal by means of a simple configuration.

SUMMARY OF THE INVENTION

The present invention provides a demodulator for demodulating a digital signal from a wobble signal modulated by an HMW modulation scheme or an MSK modulation scheme, the demodulator comprising: enhancement means for enhancing a harmonic component included in the wobble signal and outputting an enhanced modulated frequency component; sync signal generation means for generating, from the wobble signal as a sync signal, a signal of a modulation frequency synchronized with the wobble signal when the wobble signal is modulated by the HMW modulation scheme or a signal of a reference carrier frequency synchronized with the wobble signal when the wobble signal is modulated by the MSK modulation scheme; multiplication means for multiplying the generated sync signal by the enhanced wobble signal; hold means for determining a peak hold signal and a bottom hold signal of the signal obtained by multiplication; and means for demodulating a digital signal from a result of comparison of the obtained peak hold signal and the obtained bottom hold signal with the first preset threshold value and the second preset threshold value.

According to the present invention, since a modulation frequency component is enhanced, demodulation can be performed reliably. Since integration or the like is not required after multiplication, the configuration of the apparatus can be simplified.

Another invention provides a demodulator for demodulating digital information from a wobble signal modulated by an HMW modulation scheme by means of adding or subtracting an even-order harmonic signal to or from a sinewave carrier signal, the demodulator comprising:

enhancement means for enhancing a harmonic component included in the wobble signal and outputting an enhanced harmonic component;

sync signal generation means for generating, from the wobble signal, a binarized signal of a harmonic signal synchronized with the wobble signal;

first signal generation means for generating a first signal by means of discriminating the enhanced wobble signal from a first threshold value;

second signal generation means for generating a second signal by means of discriminating the enhanced wobble signal from a second threshold value; and means for computing a logical AND product of the binarized harmonic signal and the first signal and a logical AND product of the binarized harmonic signal and the second signal, thereby demodulating a digital signal from the generated logical AND products.

According to the present invention, since the harmonic component included in the wobble signal has been enhanced in advance, HMW demodulation can be performed reliably even when the harmonic component is unstable. Moreover, HMW demodulation can be performed without involvement of multiplication, integration, or the like, and hence the configuration of the apparatus can be simplified.

Still another invention provides a demodulator for demodulating digital information from a carrier signal of a predetermined frequency and a wobble signal which is MSK-modulated by means of a sinewave signal of a frequency differing from the frequency of the carrier signal, the demodulator comprising:

enhancement means for enhancing the different frequency component included in the wobble signal and outputting an enhanced frequency component;

hold means for determining a peak hold signal and a bottom hold signal of the enhanced signal;

first signal generation means for generating a first signal by means of discriminating the peak hold signal from a first threshold value;

second signal generation means for generating a second signal by means of discriminating the peak hold signal from a second threshold value; and means for computing a logical AND product of the first signal and the second signal, wherein a digital signal is demodulated from the obtained AND product.

According to the present invention, since the different frequency component included in the wobble signal has been enhanced in advance, HMW demodulation can be performed reliably even when the different frequency component is unstable. Moreover, HMW demodulation can be performed without involvement of multiplication, integration, or the like, and hence the configuration of the apparatus can be simplified.

In relation to the these inventions, the enhancement means is a bandpass filter set such that a modulation frequency becomes higher in gain than the frequency of a carrier signal. In a particularly preferred mode, the enhancement means is a bandpass filter set such that the modulation frequency is set to a center frequency.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail by reference to the following figures, wherein.

DETAILED DESCRIPTION OF THE PREFERRED EMBODIMENT

A preferred embodiment of the present invention will be described hereinbelow by reference to the drawings. An optical disk to be handled by an optical disk apparatus which is an embodiment of the present invention will first be briefly described. The optical disk apparatus of the present invention handles a Blu-ray disk. As is well known, the Blu-ray disk embeds address information into a wobble signal through combined use of the HMW modulation scheme and the MSK modulation scheme.

Figure 1:
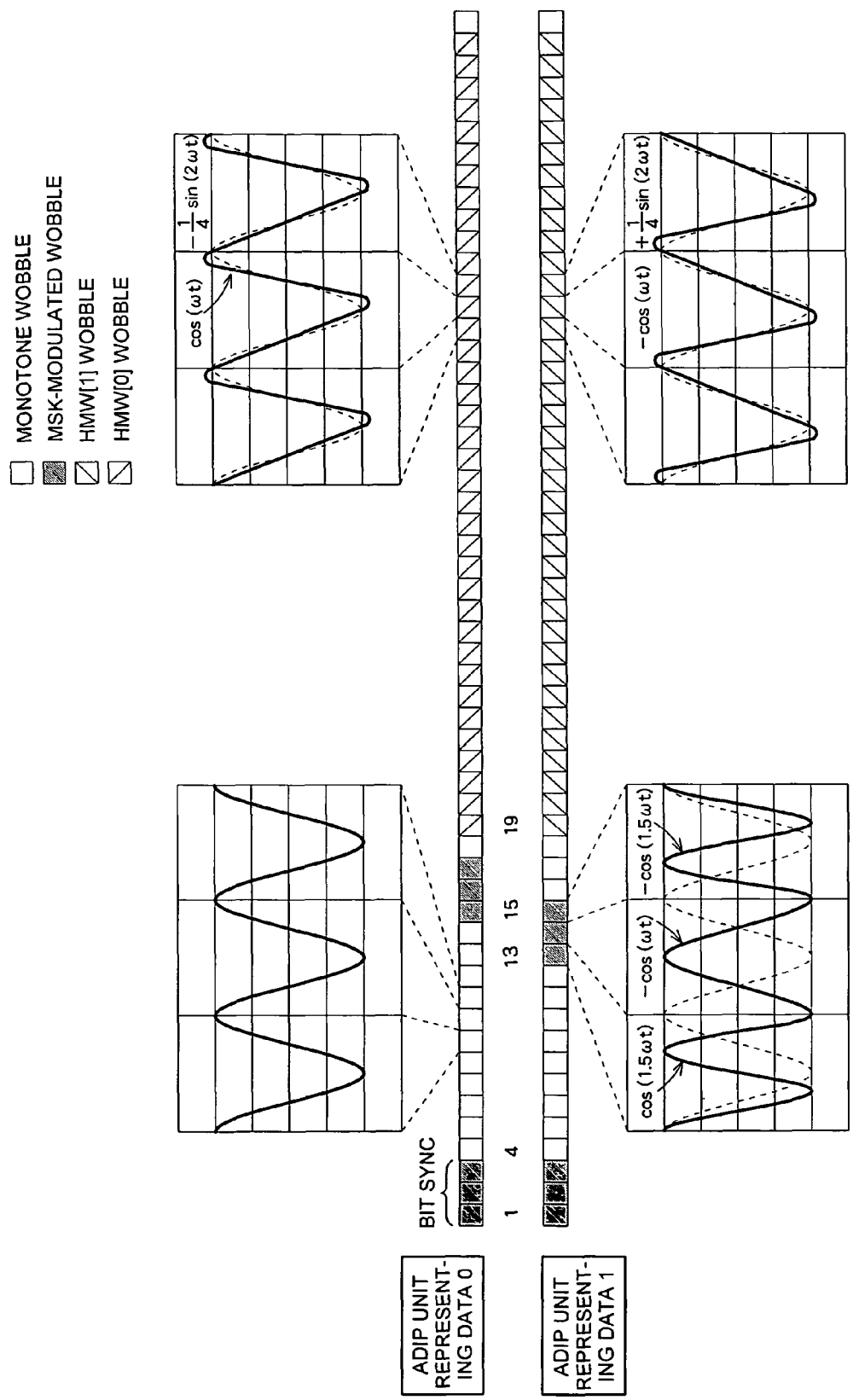
FIG. 1 is a view for describing an address format of a Blu-ray disk.

FIG. 1 is a view for schematically describing an address format of a Blu-ray disk. In FIG. 1, each field represents one period of one carrier signal (hereinafter simply called a "carrier period") of a wobble signal. A blank field denotes an unmodulated monotone wobble signal; a gray field denotes an MSK-modulated wobble signal; and a field with a sloped line denotes an HMW-modulated wobble signal.

In the Blu-ray disk, one bit of digital information is represented by wobble signals of 56 carrier periods. The 56 carrier periods are collectively called an ADIP (Address-in Pregroove). An ADIP word is formed by an aggregation of 83 ADIP units. One ADIP word expresses one piece of address information. Of the 83 ADIP units, eight ADIP units are unmodulated ADIP units which are not HMW-modulated. The unmodulated ADIP units are provided consecutively and used for detecting a word sync signal showing the start position of an ADIP word, or for other operations.

The ADIP unit is divided broadly into two groups of carrier periods; namely, one group consists of 18 carrier periods of the first half, and the other group consists of 38 carrier periods of the latter half. In the following descriptions, the 18 carrier periods of the first half are called an "MSK-modulated section," and the 38 carrier periods of the latter half are called an "HMW-modulated section." In the MSK-modulated section, one bit of digital data value indicated by the ADIP unit is embedded by means of the MSK modulation scheme. In the HMW-modulated section, another one bit of the same is embedded by means of the HMW modulation scheme.

In the MSK modulation scheme, frequency modulation is performed by use of two frequencies, one frequency being equal to the frequency of a reference carrier signal, and the other frequency being 1.5 times the frequency of the reference carrier signal. Consequently, provided that a reference carrier signal is represented as $\cos(\omega t)$, binary digit "0" is represented by $\{\cos(\omega t)\}$ or $\{-\cos(\omega t)\}$. Binary digit "1" is represented by $\{\cos(1.5\omega t)\}$ or $\{-\cos(1.5\omega t)\}$. A signal waveform generated by continuation of three carrier periods of $\{\cos(1.5\omega t)\}$, $\{-\cos\omega t)\}$, and $\{-\cos(1.5\omega t)\}$ is called an MSK modulation mark. In the Blu-ray disk, the first MSK modulation mark is inserted into the top of the ADIP unit and utilized for detecting bit sync. Moreover, one-bit digital data value indicated by the ADIP unit is expressed by the location where the second MSK modulation mark is inserted. Specifically, when the second MSK modulation mark is inserted into a location 13 to 15 carrier periods from the top of the ADIP unit, the digital data value of the ADIP unit assumes one. Meanwhile, when the second MSK modulation mark is inserted into a location 15 to 17 carrier periods from the top of the ADIP unit, the digital data value of that ADIP unit assumes 0.

The HMW modulation scheme is a modulation method for adding or subtracting a harmonic signal of an even order (e.g., a second order) to or from a sinewave reference carrier signal. Therefore, provided that the carrier signal is represented as $\cos(\omega t)$, binary digit "0" is represented by $\{\cos(\omega t) - A \cdot \sin(2\omega t)\}$, and binary digit "1" is represented by $\{\cos(\omega t) + A \cdot \sin(2\omega t)\}$. In the Blu-ray disk, HMW-modulated wobble signals are made continual over 38 carrier periods in accordance with the digital data value indicated by the ADIP unit. For instance, when a digital data value represented by a certain ADIP unit assumes a value of 0, 38 HMW[0] wobble signals become continual in the HMW-modulated section of the ADIP unit. Resistance to shifts in wobbling action, and the like, is enhanced by means of rendering the HMW-modulated wobble signals showing a single digital data value continual over the 38 carrier periods.

Figure 2:
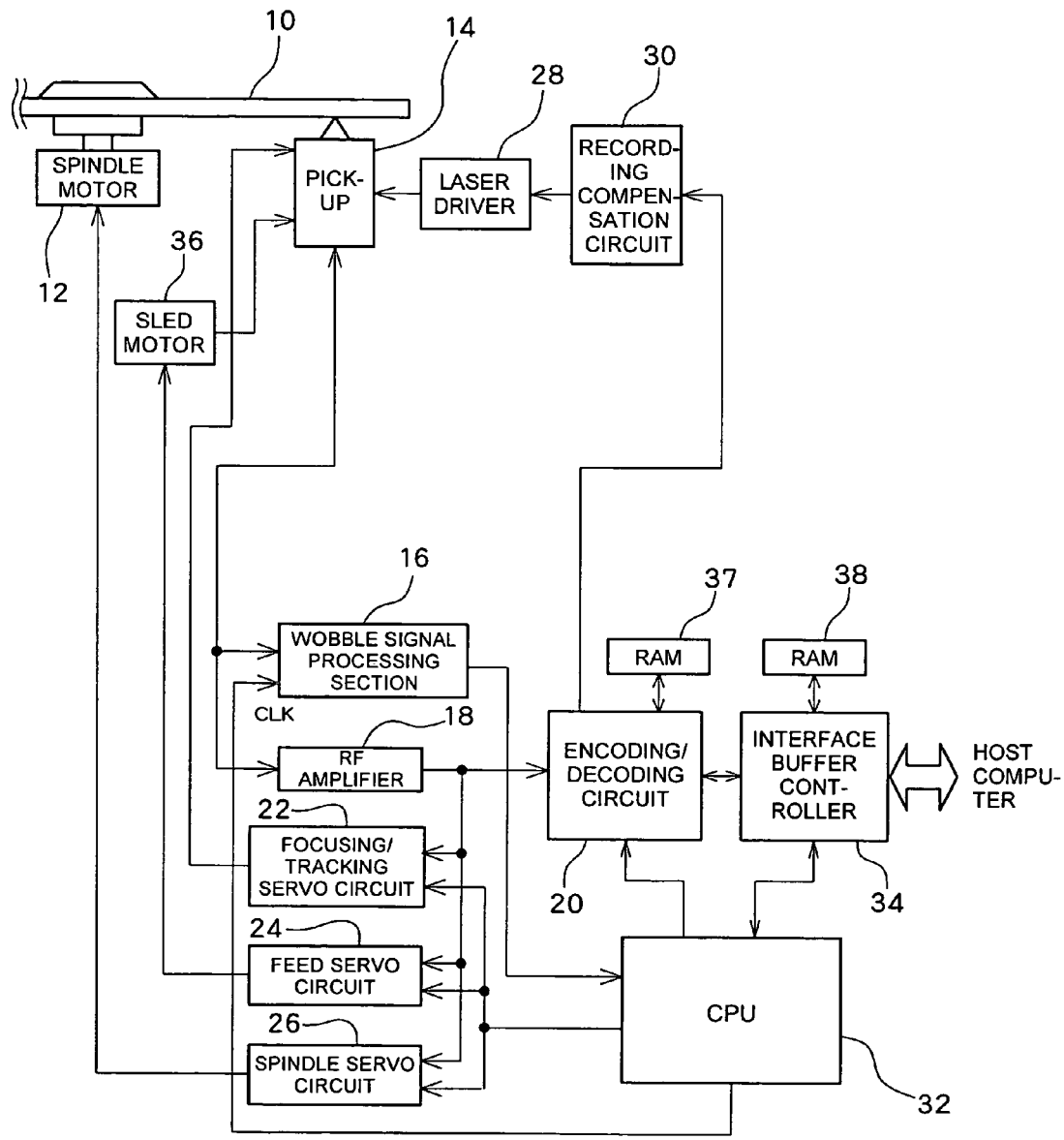
FIG. 2 is a block diagram showing the configuration of an optical disk drive which is an embodiment of the present invention.

An optical disk apparatus of the present invention which handles such a Blue-ray disk will now be described. FIG. 2 is a block diagram showing the configuration of an optical disk apparatus. A spindle motor 12 of the optical disk apparatus rotationally drives the optical disk 10 such that the optical disk 10 rotates at a predetermined rotational speed. The spindle motor 12 is servo-controlled by a spindle servo circuit 26.

A pickup 14 has a laser diode and a photodetector, and is disposed opposite the optical disk 10. The pickup 14 records data by means of radiating a laser beam on the optical disk 10; and converts the light reflected from the optical disk 10 into an electrical signal, thereby outputting a reproduction signal. The position of a laser beam radiated by the pickup 14 to the optical disk 10 is controlled by means of a thread motor 36 (a feed motor) and a focus-and-tracking servo circuit 22. The thread motor 36 drives a carriage forming the pickup 14 in a radial direction of the optical disk 10 by means of control operation of a feed servo circuit. The focus-and-tracking servo circuit 22 drives a focus-and-tracking actuator of the pickup 14, thereby performing controlling of focusing/tracking operation. A reproduction signal output from the pickup 14 is supplied to a wobble signal processing section 16 and an RF amplifier 18.

The wobble signal processing section 16 extracts a wobble signal from the reproduction signal and demodulates the digital information embedded in the wobble signal. The thus-demodulated digital information is supplied to a CPU 32. The specific configuration of this wobble signal processing section 16 will be described in detail later.

The RF amplifier 18 amplifies the reproduction signal and supplies the thus-amplified signal to various servo circuits, such as an encoding-and-decoding circuit 20, the focus-and-tracking servo circuit 22, a feed servo circuit 24, and the spindle servo circuit 26.

The encoding-and-decoding circuit 20 has an equalizer, a PLL circuit for generating a reference clock signal, and a binarizer; and decodes the reproduction signal and supplies the thus-decoded signal to an interface buffer controller 34. RAM 37 is used as a work-and-storage area for the encoding-and-decoding circuit 20. At the time of recording of data, the encoding-and-decoding circuit 20 encodes data to be recorded, and supplies the thus-encoded data to a recording compensation circuit 30. The recording compensation circuit 30 drives a laser driver 28 by means of a predetermined recording strategy in accordance with the encoded data. The laser driver 28 supplies a laser diode in the pickup 14 with a drive current, thereby causing the laser diode to emit a laser beam of recording power.

The interface buffer controller 34 controls a data buffer and exchange of data with a host computer. RAM 38 is used as a work-and-storage area for the interface buffer controller 34.

The CPU 32 controls the entire apparatus in accordance with a command from the host computer. The wobble signal extracted and decoded by the wobble signal processing section 16 is supplied to the CPU 32 as mentioned above. In accordance with the wobble signal, the CPU 32 sets the size, optimum recording power, and optimum reproduction power, and the like, of the optical disk 10, to thus control individual sections. Since the basic frequency fwob of the wobble signal has already been known, the frequency can also be used for controlling the rotational speed. Specifically, the wobble signal processing section 16 may also detect the frequency of a wobble signal, and the spindle servo circuit 26 may control the spindle motor 12 in accordance with the thus-detected frequency.

Figure 3:
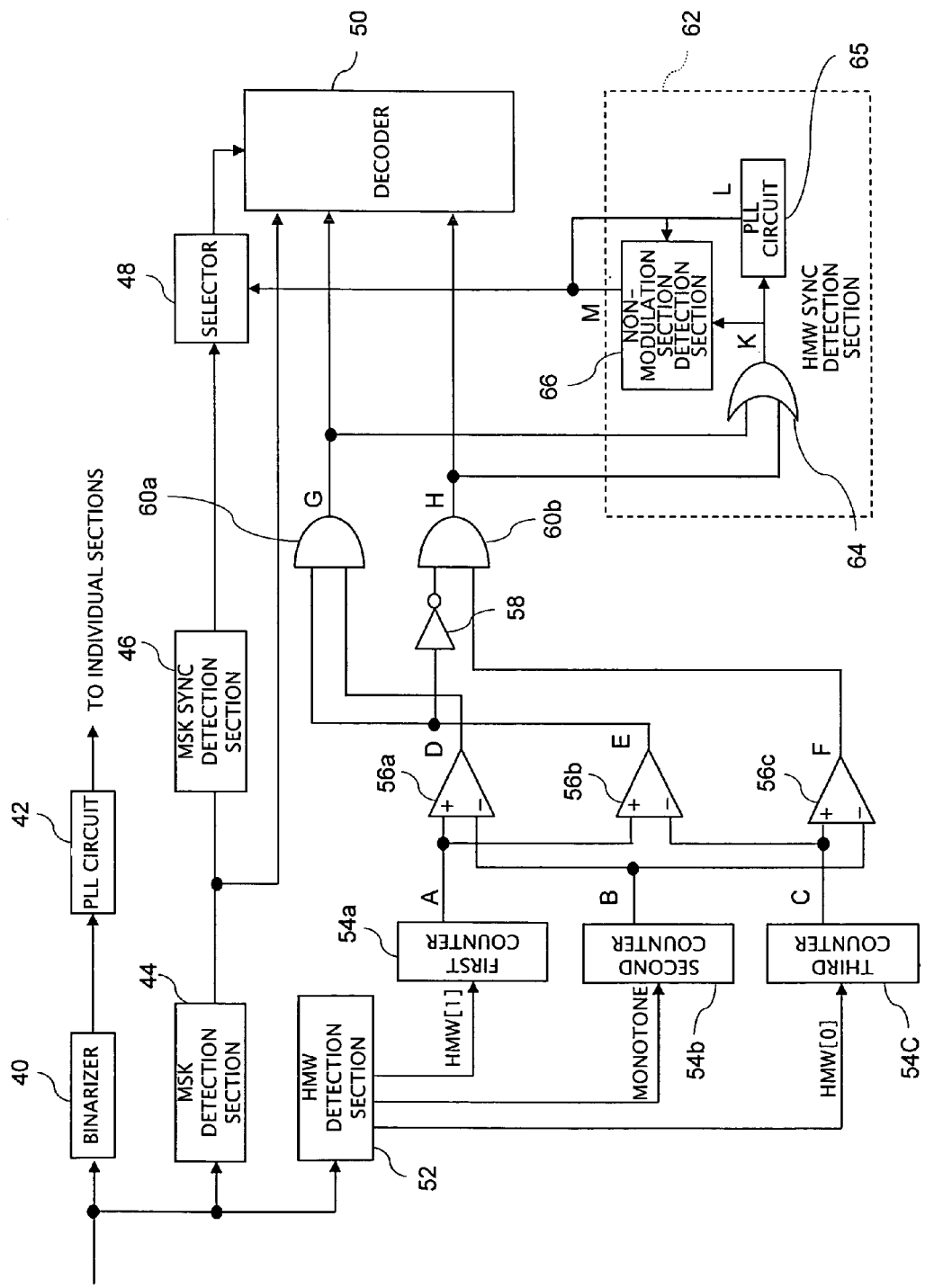
FIG. 3 is a block diagram showing the configuration of a wobble signal processing section.

FIG. 3 is a block diagram showing the configuration of the wobble signal processing section 16. The reproduced wobble signal is supplied to a binarizer 40, an MSK detection section 44, and an HMW detection section 52. After having binarized the wobble signal, the binarizer 40 outputs the thus-binarized signal to a PLL circuit 42. The PLL circuit 42 detects an edge component from the input binarized wobble signal, to thus generate a wobble clock signal synchronized with a reference carrier signal $\{\cos(\omega t)\}$. The thus-generated wobble clock signal is supplied to the individual sections of the wobble signal processing section, including the MSK detection section 44 and the HMW detection section 52, and is utilized as a reference clock signal.

The MSK detection section 44 subjects the reproduced wobble signal to MSK demodulation, to thus detect an MSK modulation mark included in the wobble signal. Details on MSK demodulation will be described later. A signal output from the MSK detection section is output as an MSK detection signal, in which a bit is set on an MSK modulation mark, to an MSK sync detection section 46 and a decoder 50.

The MSK sync detection section 46 detects, from a bit pattern of the MSK detection signal, bit sync showing the top of an ADIP unit. A sync signal synchronized with the wobble clock signal is generated from the thus-detected bit sync. The thus-generated sync signal is input to a selector 48 along with the sync signal detected by an HMW sync detection section 62, which will be described later, and supplied further to the decoder 50.

The HMW detection section 52 subjects the reproduced wobble signal to HMW demodulation and determines whether a waveform corresponds to an HMW[0] wobble waveform, an HMW[1] wobble waveform, or a monotone wobble waveform for each carrier period (i.e., for each wobble waveform). Here, the monotone wobble waveform designates an unmodulated wobble waveform. This HMW detection section 52 handles an MSK-modulated wobble waveform as a monotone wobble waveform. Details on HMW demodulation will be described later.

A result of detection is output from any of a total of three output terminals; namely, an output terminal for an HMW[0] wobble waveform, an output terminal for an HMW[1] wobble waveform, and an output terminal for a monotone wobble waveform. Specifically, a detection result showing HMW[1] is output from the HMW[1] terminal as a detection signal on which is set a bit according to detection of an HMW[1] wobble waveform. A detection result showing HMW[0] is output from the HMW[0] terminal as a detection signal on which is set a bit according to detection of an HMW[0] wobble waveform. A detection result showing monotone is output from the monotone terminal as a detection signal on which is set a bit according to detection of a monotone wobble waveform.

A value output from the HMW detection section 52 is input to the decoder 50 via counters 54, comparators 56, and AND circuits 60, all of which are assigned to the HMW detection section 52. The operation of this counter 54, or the like, will be described in detail later. The HMW sync detection section 62 is provided in a stage subsequent to the AND circuits 60, and bit sync is detected in accordance with a result of HMW demodulation. A value output from the HMW sync detection section 62 is input to the selector 48, where the value is utilized for decoding an address.

Figure 4:
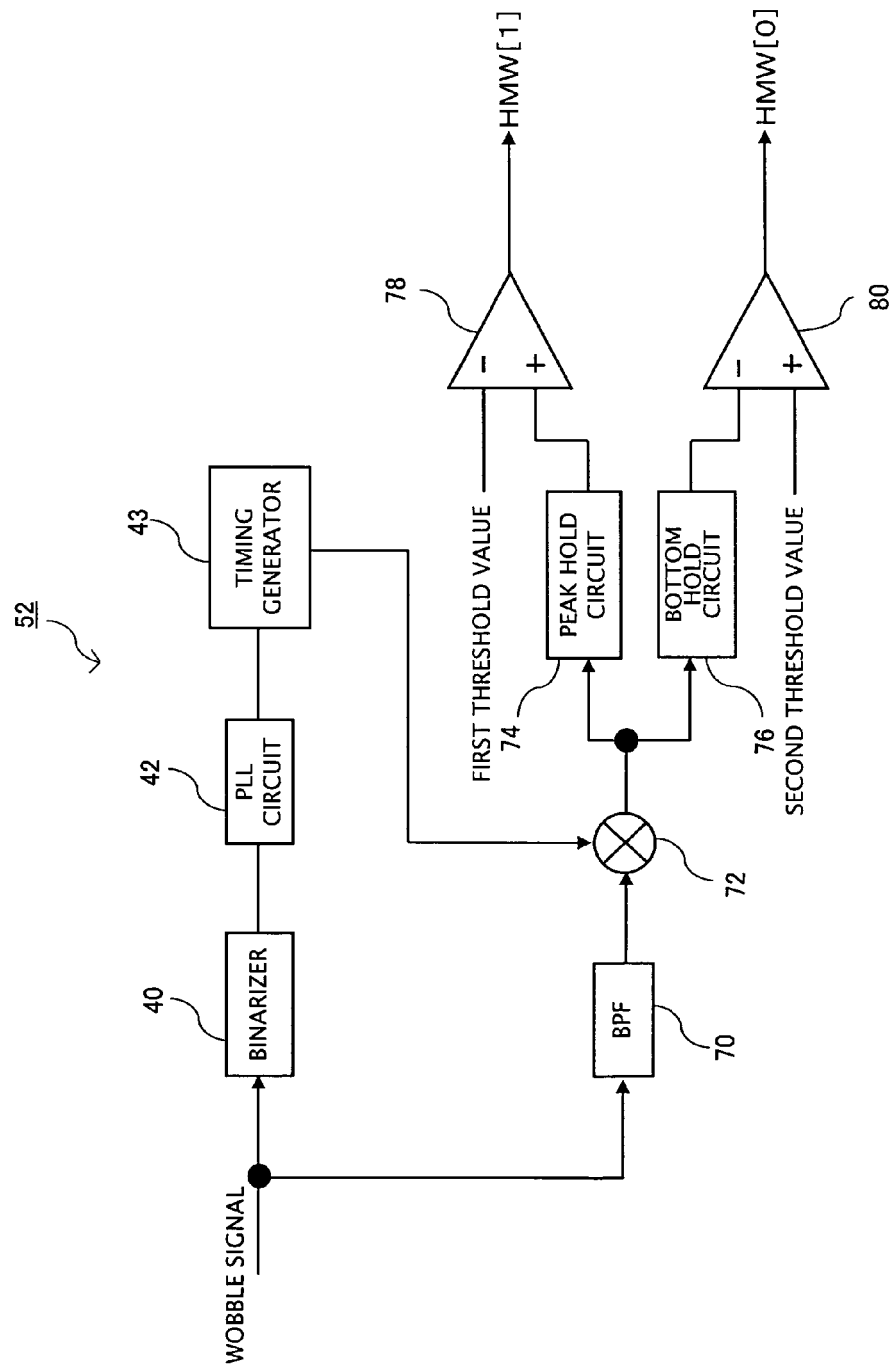
FIG. 4 is a block diagram showing the configuration of an HMW detection section.

Details on the respective sections will now be described. FIG. 4 is a block diagram showing a more detailed configuration of the HMW detection section 52. The HMW detection section 52 of the present embodiment is simpler in configuration than a related-art HMW demodulation circuit, and enables more reliable HMW demodulation operation. Specifically, an HMW demodulation circuit of heterodyne type disclosed in Japanese Patent Laid-Open Publication No. 2003-123249 is known as the related-art HMW demodulation circuit. In this heterodyne type, a wobble signal and a second harmonic wave signal are subjected to multiplication, and a signal determined by multiplication is summed on a per-data-clock basis. A sign of digital information is determined from the summed value achieved at the end edge of the data clock signal. In relation to the carrier signal, a harmonic component included in the reproduced wobble signal is of about 12 dB. However, the second harmonic component readily becomes unstable for reasons of variations in manufacture of an optical disk or influence of crosstalk from adjacent tracks. Consequently, detection of a harmonic component becomes difficult, which in turn poses difficulty in demodulation of a digital signal. Moreover, an integrator or the like is indispensable for the heterodyne type, and the overall circuitry of the heterodyne-type HMW demodulation circuit is complicated.

The HMW detection section 52 of the present embodiment is configured to solve the drawbacks. The HMW detection section 52 of the present embodiment will be described in detail hereunder. A reproduced wobble signal is input to the binarizer 40 and a bandpass filter (hereinafter called "BPF") 70. After having subjected a wobble signal to binarization processing, the binarizer 40 outputs the thus-binarized wobble signal to the PLL circuit 42. The PLL circuit 42 detects an edge component from the input binarized wobble signal, to thus generate a wobble clock signal in synchronism with a reference carrier signal $\{(\cos(\omega t)\}$. The thus-generated wobble clock signal is supplied to a timing generator 43. The timing generator 43 generates from the wobble clock signal a second harmonic wave signal $\{\sin(2\omega t)\}$ synchronized with the input wobble signal, and supplies the thus-generated signal to a multiplier.

Figure 5:
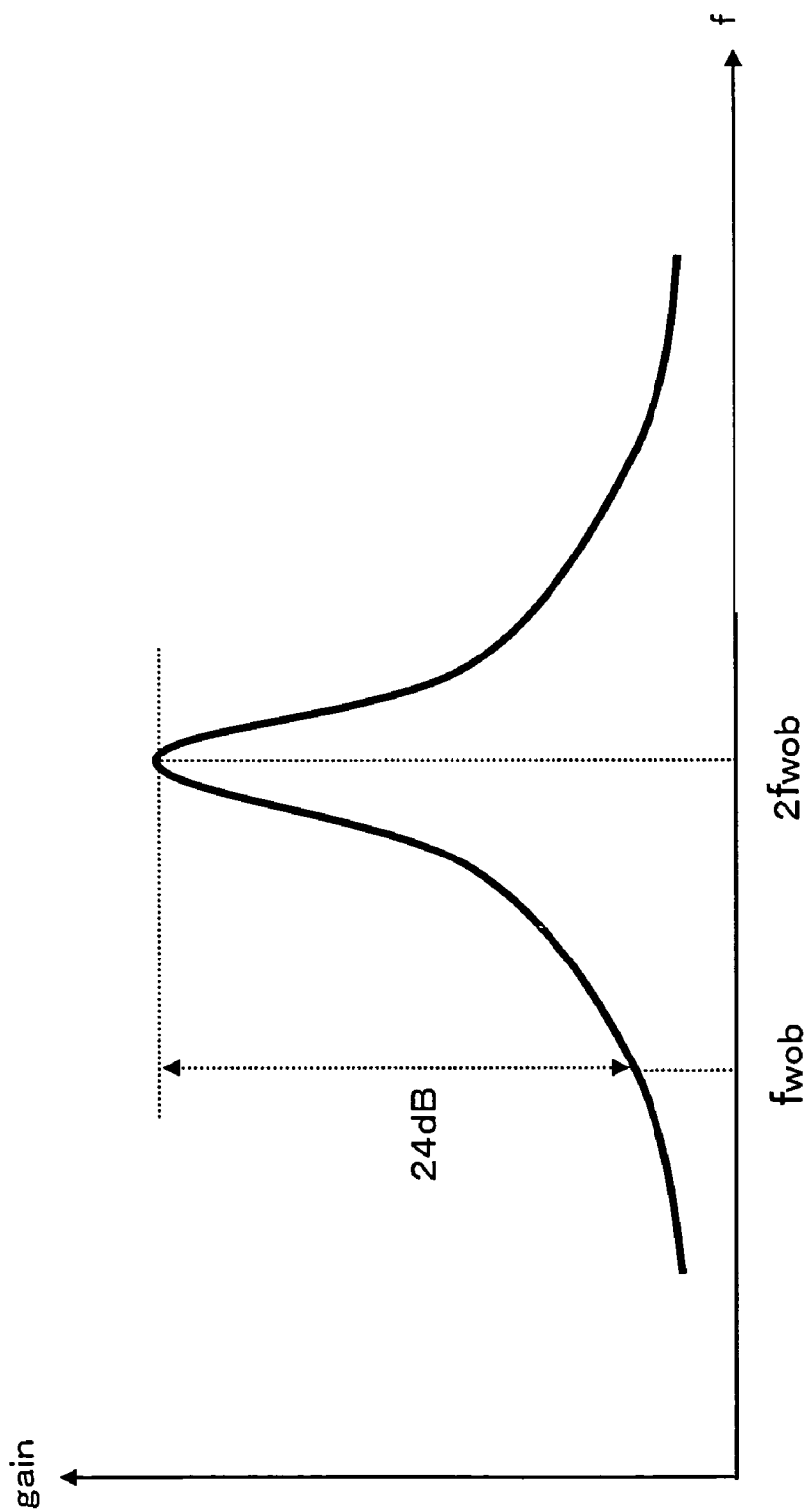
FIG. 5 is a view showing a frequency characteristic of a BPF.

The BPF 70 serves as extraction means for extracting a second harmonic component from a wobble signal, and enhances and outputs a harmonic component of the wobble signal. FIG. 5 is a view showing an example frequency characteristic of this BPF 70. In FIG. 5, reference symbol fwob denotes a reference frequency of a basic carrier signal; and reference symbol 2fwob denotes a frequency which is double the reference frequency; in other ways, the frequency of a second harmonic component. The BPF 70 of the present embodiment takes the frequency 2fwob of the second harmonic component as a center frequency, and a gain difference between the frequency 2fwob of a harmonic component and the reference frequency fwob is about 24 dB. The frequency characteristic shown in FIG. 5 is an example. So long as the frequency 2fwob of the second harmonic component is higher in gain than the reference frequency fwob, the frequency may also assume a different frequency characteristic. A frequency adjustment device, such as an equalizer, may also be used in place of the BPF 70, so long as the frequency 2fwob of the second harmonic component is output to have a gain higher than that of the reference frequency fwob.

A wobble signal whose second harmonic component has been enhanced by the BPF 70 is output to a multiplier 72. The multiplier 72 multiplies the second harmonic signal $\{\sin(2\omega t)\}$ supplied from the timing generator 43 by the wobble signal having passed through the BPF. The thus-multiplied signal is supplied to a peak-hold circuit 74 and a bottom-hold circuit 76, where a peak envelope and a bottom envelope of the multiplied signal are detected. The peak envelope and the bottom envelope are input, along with a preset first threshold value and a preset second threshold value, to a first comparator 78 and a second comparator 80 where the envelope signals are discriminated from the threshold values, thereby detecting an HMW[0] waveform and an HMW[1] waveform.

Figure 6:
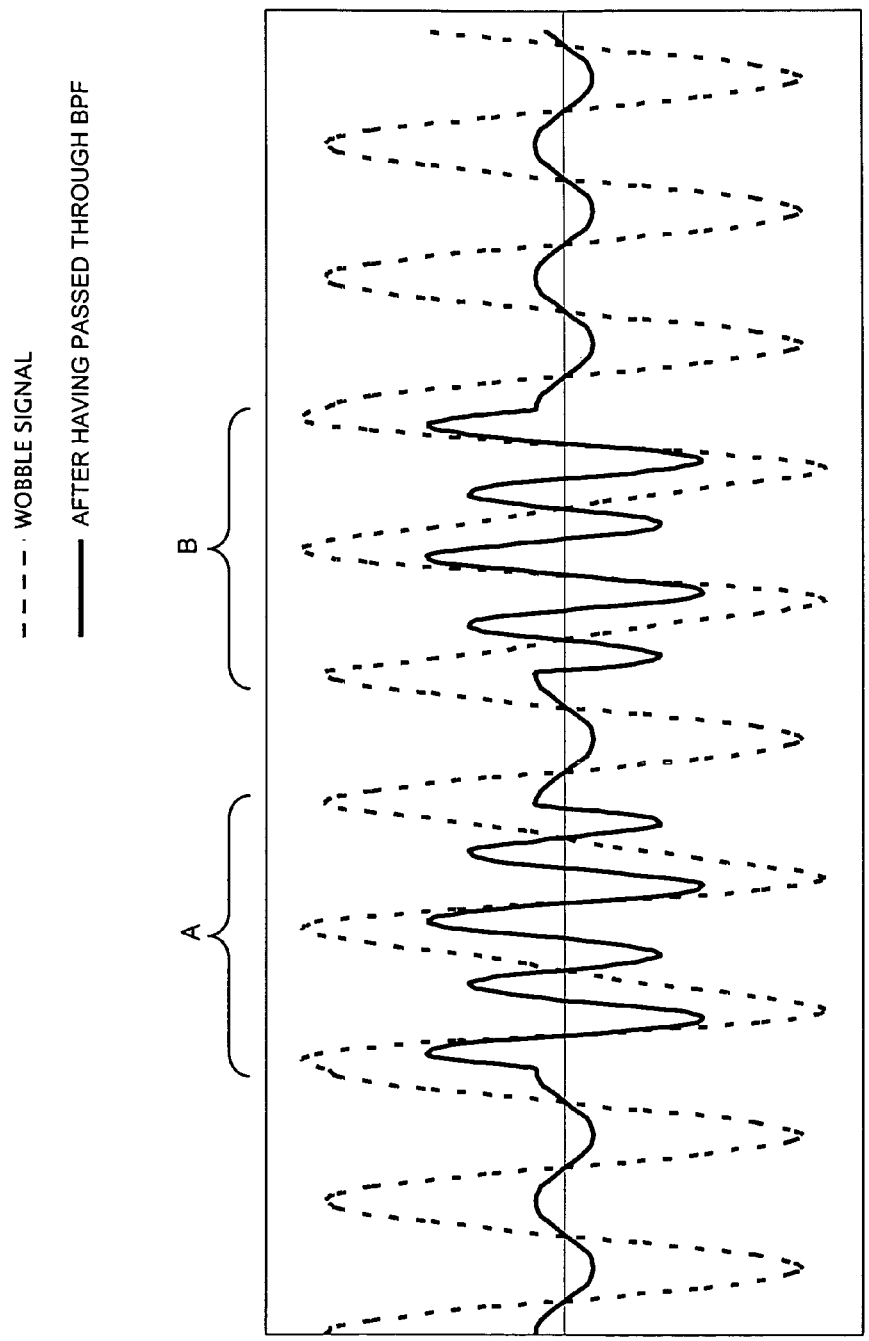
FIG. 6 is a view showing the waveform of a wobble signal and the waveform of the wobble signal acquired after the signal has passed through the BPF.

The flow of demodulation performed by this HMW demodulation section 52 will now be described by reference to the drawings. FIG. 6 is a view showing the waveform of a reproduced wobble signal and the waveform of a wobble signal having passed through a BPF. In FIG. 6, portions A and B denote modulated areas; the portion A notes a portion of the HMW[1] wobble waveform to which a second harmonic component is added; and the segment B denotes a portion of the HMW[0] from which the second harmonic component is subtracted.

In FIG. 6, broken lines denote a reproduced wobble signal. In the case of the HMW[0] wobble waveform, the reproduced wobble signal is represented by $\{\cos(\omega t) - \frac{1}{4}\sin(2\omega t)\}$. In the case of the HMW[1] wobble waveform, the reproduced wobble signal is represented by $\{\cos(\omega t) + \frac{1}{4}\sin(2\omega t)\}$. In the case of a monotone waveform, the reproduced wobble signal corresponds to the reference carrier signal $\{\cos(\omega t)\}$. A solid line shown in FIG. 6 depicts a signal waveform of this wobble signal acquired after the signal has passed through the BPF 70 having a frequency characteristic shown in FIG. 5. The wobble signal having passed through the BPF is understood to assume a waveform whose harmonic component has been enhanced.

Figure 7:
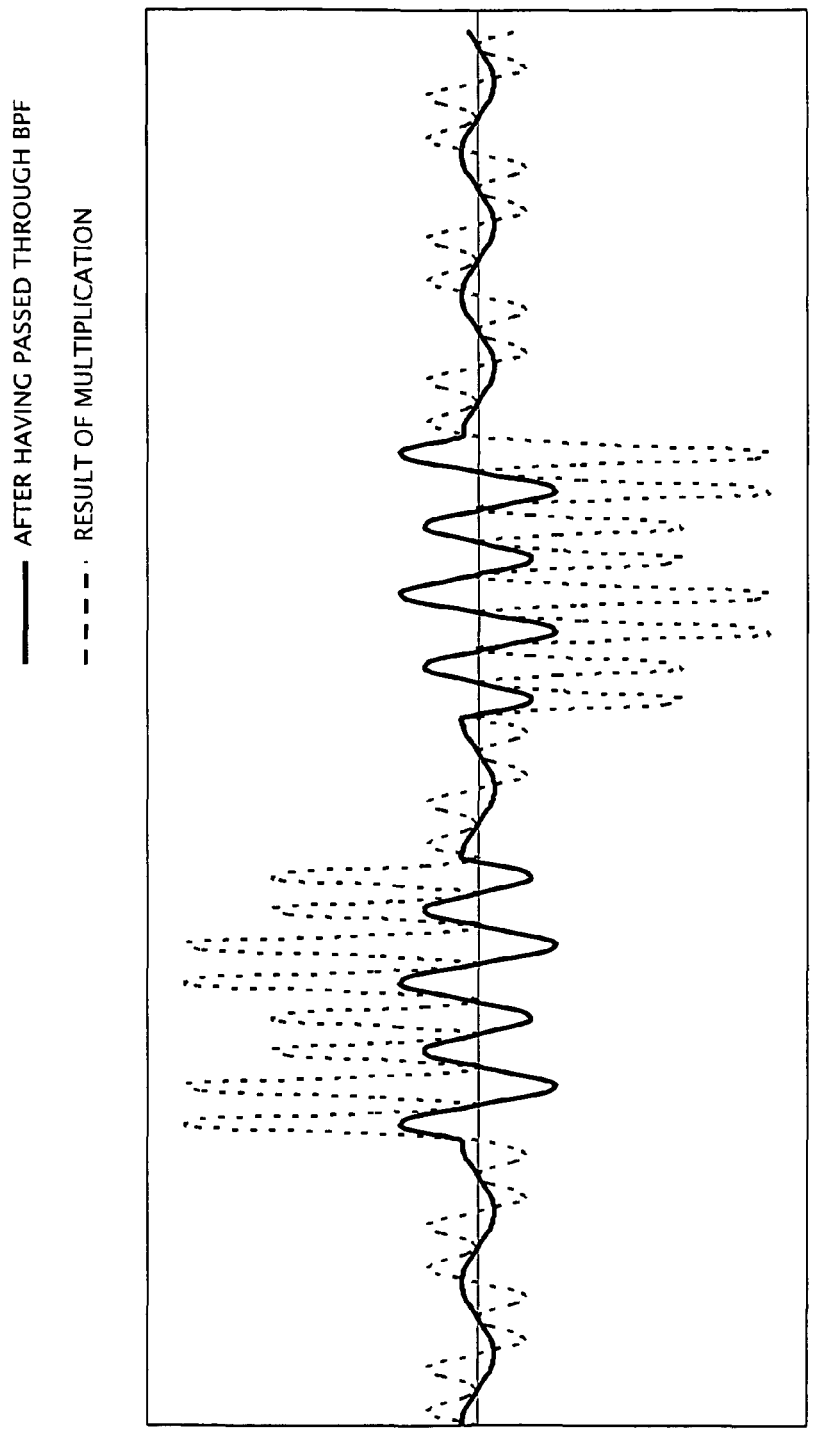
FIG. 7 is a view showing the waveform of the wobble signal acquired after the signal has passed through the BPF and the waveform of the wobble signal acquired after the signal has been multiplied.

Subsequently, the wobble signal having passed through the BPF is multiplied by a second harmonic signal $\{\sin(2\omega t)\}$ generated by the timing generator 43. FIG. 7 shows a waveform acquired through multiplication. A solid line depicts the waveform of a wobble signal having passed through the BPF, and a broken line depicts the waveform of the multiplied wobble signal. In the present embodiment, prior to multiplication, the wobble signal is caused to pass through the BPF 70, whereby the second harmonic component of the wobble signal is enhanced. Therefore, the amplitude of the modulated portion A to which the second harmonic component has been added or the amplitude of the modulated portion B from which the second harmonic component has been removed becomes higher than that acquired by the technique described in Japanese Patent Laid-Open Publication No. 2003-123249 in which a wobble signal is not caused to pass through a BPF. Put another way, an amplitude difference between the modulated portions A, B and the monotone waveform has become greater than that achieved in the related art. Consequently, even when the second harmonic component has become unstable because of variations in manufacture of an optical disk or the influence of crosstalk from adjacent tracks, the modulated portion A to which the second harmonic component has been added or the modulated portion B from which the second harmonic component has been subtracted can be reliably detected.

In the present embodiment, after the second harmonic component has been enhanced by the BPF 70, the wobble signal is multiplied by the second harmonic signal. Therefore, the amplitude center of the portion A (HMW[1]) to which the second harmonic component has been added shifts toward the positive domain, and the amplitude center of the portion B (HMW[0]) from which the second harmonic component has been subtracted shifts toward the negative domain. Consequently, modulated portions and values represented thereby can be detected on the basis of a top peak value and a bottom peak value of the multiplied second harmonic signal. Specifically, after the peak-hold circuit 74 and the bottom-hold circuit 76 have detected a multiplied envelope signal, modulated portions and values represented thereby can be detected by means of discriminating the envelope signal from a threshold value. Put another way, an integrator, or the like, which has been indispensable in the related art becomes obviated, and HMW demodulation can be performed with a simpler configuration.

Figure 8:
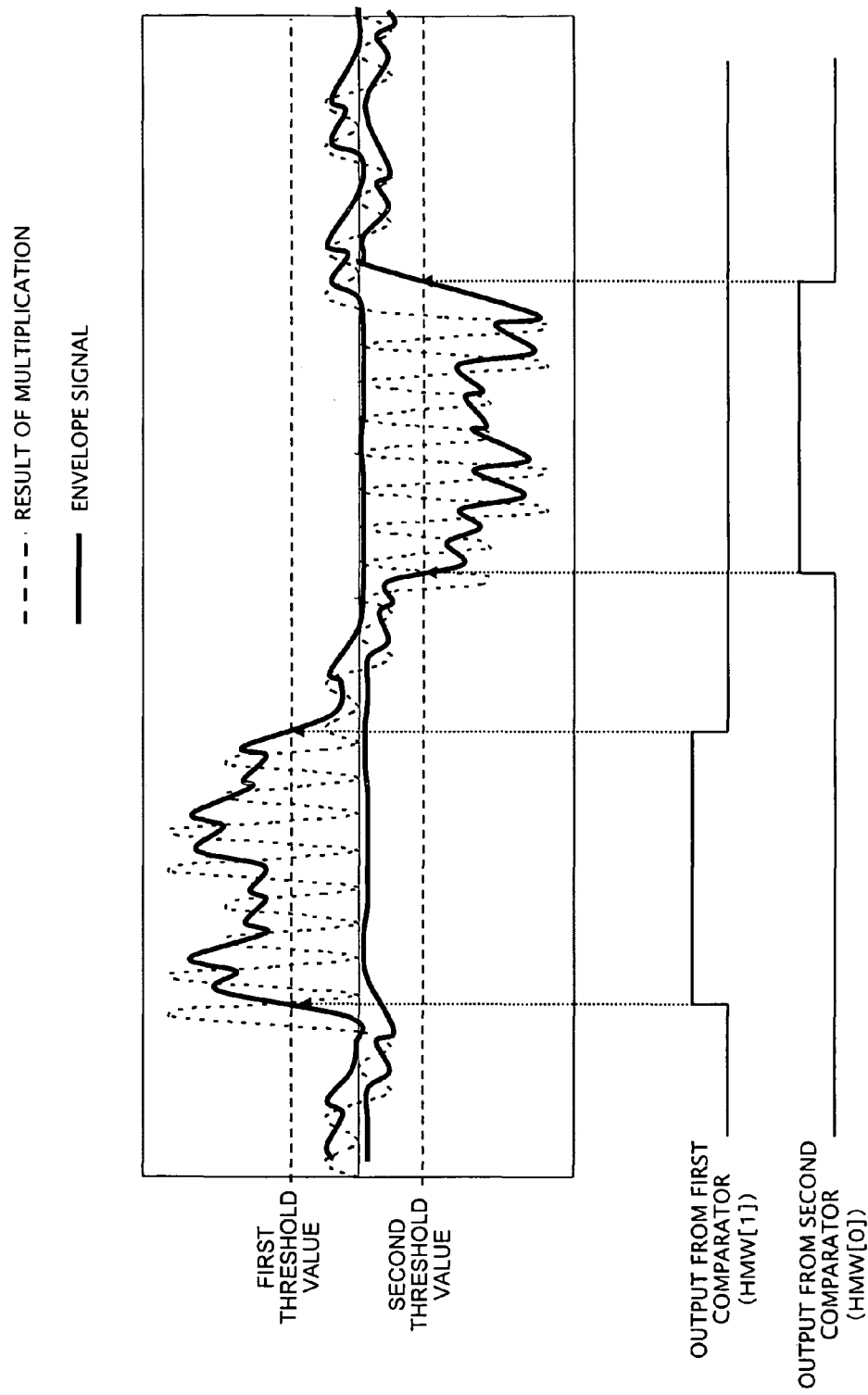
FIG. 8 is a view showing detection of an HMW signal.

FIG. 8 is a view showing demodulation of the hold circuits 74, 76 and the comparators 78, 80. In FIG. 8, the waveform of the multiplied signal and the waveform of the envelope signal are shown in an upper row; a signal output from the first comparator 78 is shown in a middle row; and a signal output from the second comparator 80 is shown in a lower row.

The peak envelope signal detected by the peak hold circuit 74 is input to the first comparator 78 along with a preset first threshold value. The first comparator 78 compares the peak envelope value with the first threshold value. When the peak envelope value is greater than or equal to the first threshold value, the first comparator 78 outputs a High signal. When the peak envelope value is less than the first threshold value, the first comparator 78 outputs a Low signal. A signal output from the first comparator 78 becomes a signal used for detecting the HMW[1] wobble waveform.

Likewise, a preset second threshold value and the bottom envelope signal are input to the second comparator 80. The second comparator 80 compares the bottom envelope value with the second threshold value. When the bottom envelope value is less than or equal to the second threshold value, the second comparator 80 outputs a High signal. When the bottom envelope value of the same is greater than or equal to the second threshold value, the second comparator 80 outputs a Low signal. A signal output from the second comparator 80 becomes a signal used for detecting the HMW[0] wobble waveform.

The first and second threshold values may be fixed or variable values, so long as a value which is greater than the top peak value of a multiplied monotone portion is set as the first threshold value and a value which is smaller than the bottom peak value of the multiplied monotone portion is set as the second threshold value. Consequently, X % of the maximum value or the minimum value of a multiplied signal may be set as the first threshold value or the second threshold value. Alternatively, the first threshold value and the second threshold value may be varied according to an error rate.

In short, in the present embodiment, the amplitude center of a multiplied signal in the HMW[1] portion has shifted toward the positive domain, and the amplitude center of a multiplied signal in the HMW[0] portion has shifted toward the negative domain. Therefore, after multiplication, modulated portions and values thereof can be distinguished by means of merely discriminating the envelope signal from a threshold value. Consequently, an HMW signal can be demodulated by means of a configuration which is simpler than that of a related-art demodulation circuit requiring an integrator or the like.

As has been described above, the HMW demodulation section of the present embodiment enables HMW demodulation in a simpler, more reliable manner.

The MSK detection section 44 of the present embodiment will now be described. The basic configuration of the MSK detection section 44 is analogous to that of the previously-described HMW detection section 52, and hence only a difference between the MSK detection section 44 and the HMW detection section 52 will be described in an emphasized manner.

Figure 9:
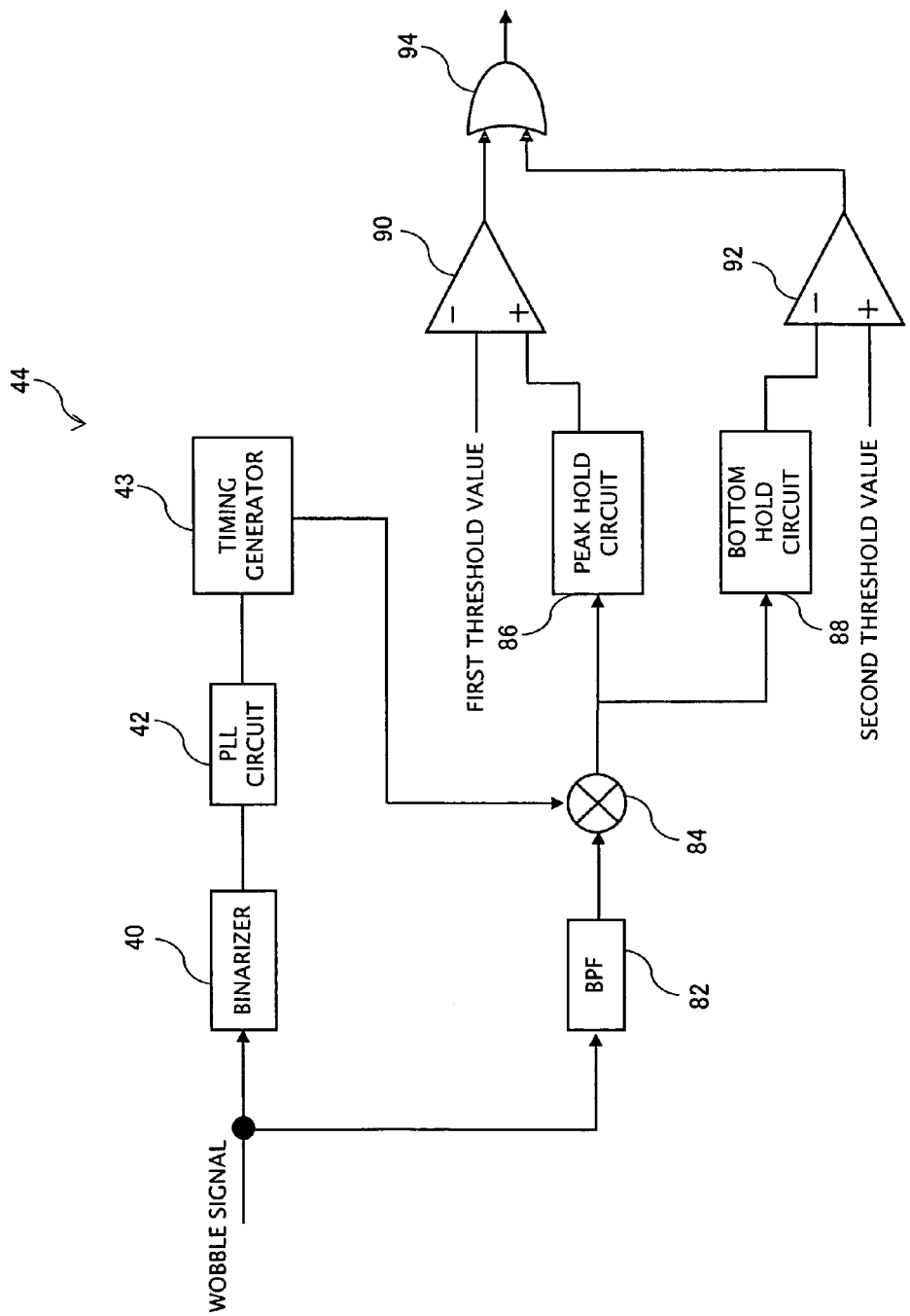
FIG. 9 is a block diagram showing the configuration of an MSK detection section.

FIG. 9 is a block diagram showing the detailed configuration of the MSK detection section 44. The MSK detection section 44 is also provided with a BPF 82. The center frequency of the BPF 82 is set to 1.5 fwob, which is 1.5 times as high as the reference frequency fwob. This is intended for outputting in an enhanced manner an MSK modulation component $\{\cos(1.5\omega t)\}$ or $\{-\cos(1.5\omega t)\}$ included in a wobble signal. The timing generator 43 generates a reference carrier signal $\{\cos(\omega t)\}$ rather than the second harmonic signal $\{\sin(2\omega t)\}$, and supplies the reference carrier signal to a multiplier 84. Specifically, the MSK detection section 44 multiplies the wobble signal having passed through the BPF by the reference carrier signal $\{\cos(\omega t)\}$. The multiplied signal is input to a peak hold circuit 86 and a bottom hold circuit 88, where an envelope signal is computed from the input signal. The computed peak envelope signal is supplied to a first comparator 90 along with the preset first threshold value. When the peak envelope value is greater than or equal to the first threshold value, the first comparator 90 outputs a High signal. When the peak envelope value is less than the first threshold value, the first comparator 90 outputs a Low signal. Similarly, the bottom envelope signal is supplied to a second comparator 92 along with a preset second threshold value. When the bottom envelope value is less than the second threshold value, the second comparator 92 outputs a High signal. When the bottom envelope value is greater than or equal to the second threshold value, the second comparator 92 outputs a Low signal. The signal output from the first comparator 90 and the signal output from the second comparator 92 are input to an OR circuit 94. The OR circuit 94 computes an exclusive OR product of the signals output from the two comparators 90, 92. The signal output from the OR circuit 94 becomes a signal used for detecting an MSK modulation mark. An equalizer or the like may also be used in place of a BPF, so long as the 1.5 fwob frequency component can be output in an enhanced manner as compared with the reference frequency component.

Figure 10:
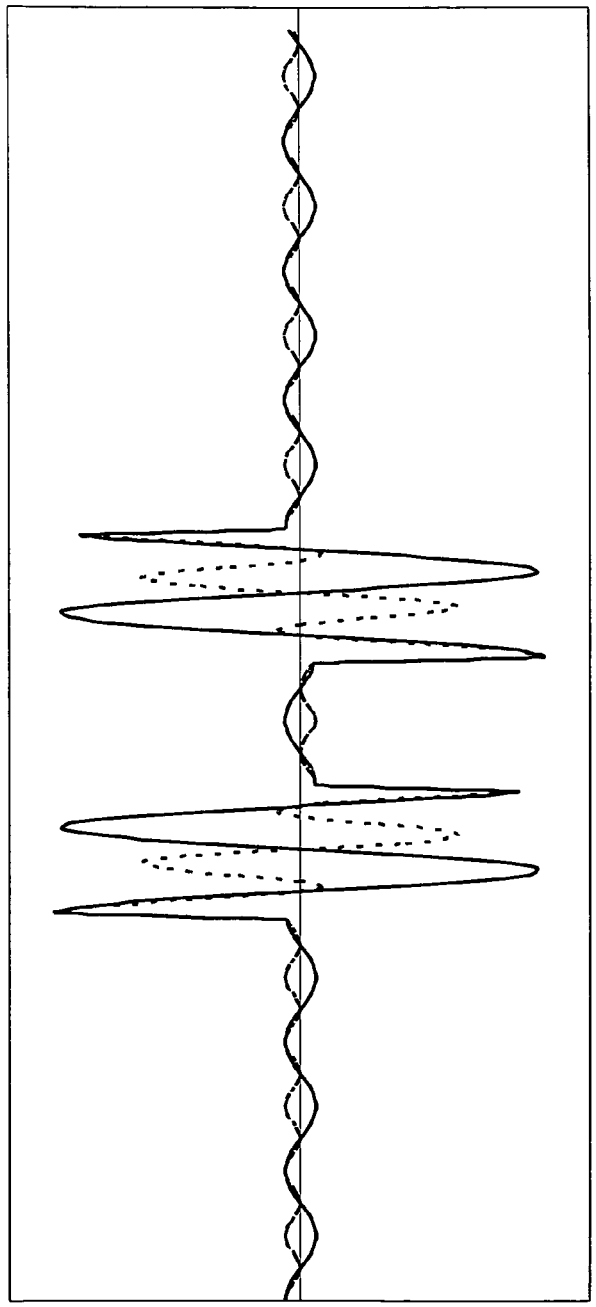
FIG. 10 is a view showing the waveform of the wobble signal acquired after the signal has passed through the BPF and the waveform of the wobble signal acquired after the signal has been multiplied.

FIG. 10 is a view showing the waveform of a wobble signal having passed through the BPF and the waveform of a multiplied signal. In FIG. 10, a solid line depicts the waveform of a wobble signal having passed through the BPF, and a broken line depicts the waveform of a multiplied signal. As is evident from FIG. 10, an MSK-modulated portion of the multiplied signal is understood to exhibit a high amplitude and to be enhanced.

Figure 11:
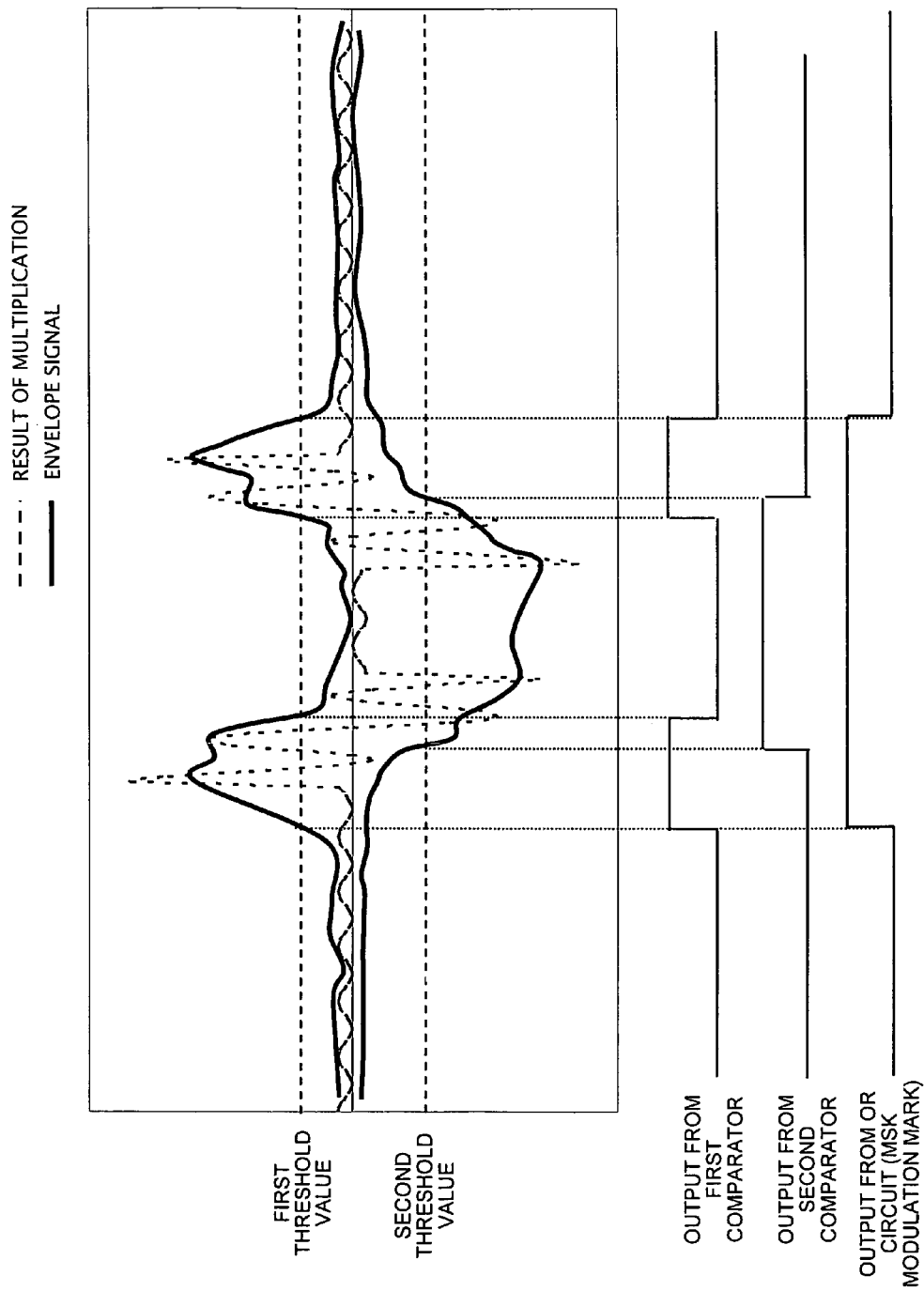
FIG. 11 is a view showing detection of MSK modulation marks.

The multiplied signal is input to the peak hold circuit 86 and the bottom hold circuit 88, and the peak envelope signal and the bottom hold signal, such as those shown in FIG. 11, are computed. Only when the peak envelop signal is greater than or equal to the peak envelope value, the first comparator 90 outputs a High signal. When the peak envelope value is less than the first threshold value, the first comparator 90 outputs a Low signal. Only when the bottom envelope value is less than or equal to the second threshold value, the second comparator 92 outputs a High signal. Signals output from the comparators 90, 92 are input to the OR circuit 94. An exclusive OR signal of the signals generated by the OR circuit 94 becomes a signal used for detecting an MSK modulation mark.

The MSK modulation mark corresponds to an area defined by means of making an MSK[0] $\{\cos(1.5\omega t)\}$ waveform, a monotone $\{\cos(\omega t)\}$ waveform, and an MSK[1] $\{-\cos(1.5\omega t)\}$ waveform consecutive. According to the MSK modulation scheme, the value of the digital signal is indicated by the position where the MSK modulation mark appears. Put another way, according to the MSK modulation scheme, a modulated signal is said to be able to be modulated, so long as the position where the MSK mark appears can be specified. In the present embodiment, the signal output from the comparator 94 becomes a signal used for detecting the MSK modulation mark.

As is evident from the above descriptions, a wobble signal is previously caused to pass through a BPF even in MSK modulation, whereby more-reliable demodulation becomes possible. A modulated component is enhanced by means of the BPF, thereby obviating a necessity for providing an integrator, or the like, subsequent to multiplication, and enabling demodulation of MSK-modulated data with a simpler configuration.

The flow of an MSK signal and an HMW signal, which have been demodulated through the above-described demodulation, is now described as follows. As shown in FIG. 3, the signal having been subjected to MSK demodulation in the MSK detection section 44 is supplied to the decoder 50, where digital data are decoded. The MSK-demodulated signal is supplied to the MSK Sync detection section 46, as well, and utilized for detecting a Sync signal. A well-known technique can be utilized for processing an MSK-demodulated signal, and hence a detailed explanation thereof is omitted.

The detection signal supplied from the HMW detection section 52 has hitherto been supplied directly to the decoder 50. The decoder 50 decodes an address in accordance with an HMW detection signal supplied from the HMW detection section 52 and the MSK detection signal supplied from the MSK detection section 44. During decoding operation, the supplied MSK detection signal and the supplied HMW detection signal are separated on a per-ADIP-unit basis, thereby determining a digital data value showing each ADIP unit.

Specifically, the position of the top of the ADIP unit is specified in accordance with the MSK detection signal and the sync detection signal, thereby determining a position where an MSK modulation mark (a second MSK modulation mark) appearing second in the ADIP unit is inserted. When the position where the second MSK modulation mark is inserted is at 13 to 15 carrier periods, the value of the ADIP unit is determined to be one. When the position where the second MSK modulation mark is inserted is at 15 to 17 carrier periods, the value of the ADIP unit is determined to be 0.

In accordance with the HMW detection signal and the sync detection signal, the value of the HMW-modulated wobble signal in each ADIP unit is determined. For instance, when a result of HMW demodulation achieved in 38 carrier periods (HMW modulation periods) of the latter half in each ADIP unit is HMW[1], a value showing the ADIP unit is determined to be one. Conversely, when the result of HMW demodulation achieved in the HMW modulation period in one ADIP unit is HMW[0], a value showing the ADIP unit is determined to be 0.

Such a determination must be based on the premise that HMW demodulation is performed accurately. Specifically, when erroneous demodulation, such as detecting a monotone waveform as an HMW[1] wobble waveform or detecting an HMW[1] wobble waveform as an HMW[0] wobble waveform, has arisen, the decoder cannot accurately determine the value of the ADIP unit. For instance, when the HMW[1] wobble waveform and the HMW[0] wobble waveform are mixedly present in the HMW-modulated section of a certain ADIP unit, the value of the ADIP unit cannot be determined to be "1" or "0," and eventually the reliability of address decoding operation is deteriorated.

As a matter of course, when the position of the top of the ADIP unit is clear, a determination can be made, to a certain extent, as to whether or not erroneous demodulation is has arisen. For instance, HMW[1] and HMW[0] appearing in the monotone section of the ADIP unit can be determined to be erroneous demodulation. However, MSK demodulation cannot be performed for reasons of a wobble shift or the like. When a bit sync signal has not been detected, erroneous demodulation of HMW raises a big problem. In this case, the location of the top of the ADIP unit cannot be specified, and a determination cannot be made as to whether or not erroneous demodulation is determined as mentioned previously. As a result, reliable address decoding operation becomes more difficult.

In the present embodiment, the quality of the result of HMW demodulation input to the decoder 50 is enhanced, and more reliable address decoding is enabled. The counter 54, the comparator 56, the AND circuit 60, and the like, which will be described later, are provided in a stage subsequent to the HMW detection section 52, thereby significantly diminishing the influence of erroneous HMW demodulation. Moreover, an HMW sync detection section is also provided in a stage subsequent to the AND circuit 60, and bit sync is also detected in accordance with a result of HMW demodulation. This will be described hereunder.

Results of detection of the HMW[0] wobble signal, the monotone wobble waveform, and the HMW[1] wobble signal performed by the HMW detection section 52 are supplied as a tentative detection signal to the counters 54*a* to 54*c* provided in a subsequent stage. The counters 54*a* to 54*c* are provided in the number of three so as to correspond to the output terminals of the HMW detection section 52. A tentative HMW[1] detection signal, a tentative monotone detection signal, and a tentative HMW[0] detection signal are supplied to corresponding counters 54*a* to 54*c*. The respective counters 54 count the number of times the HMW[1] wobble waveform generated in the past over a plurality of carrier periods, the number of times the HMW[0] wobble waveform generated in the past over a plurality of carrier periods, and the number of times the monotone wobble waveform generated in the past over the plurality of carrier periods. Put another way, the counters act as frequency computing means for computing the frequency of generation of the HMW[1] wobble waveform, the HMW[0] wobble waveform, and the monotone wobble waveform over the respective given carrier periods.

Figure 12:
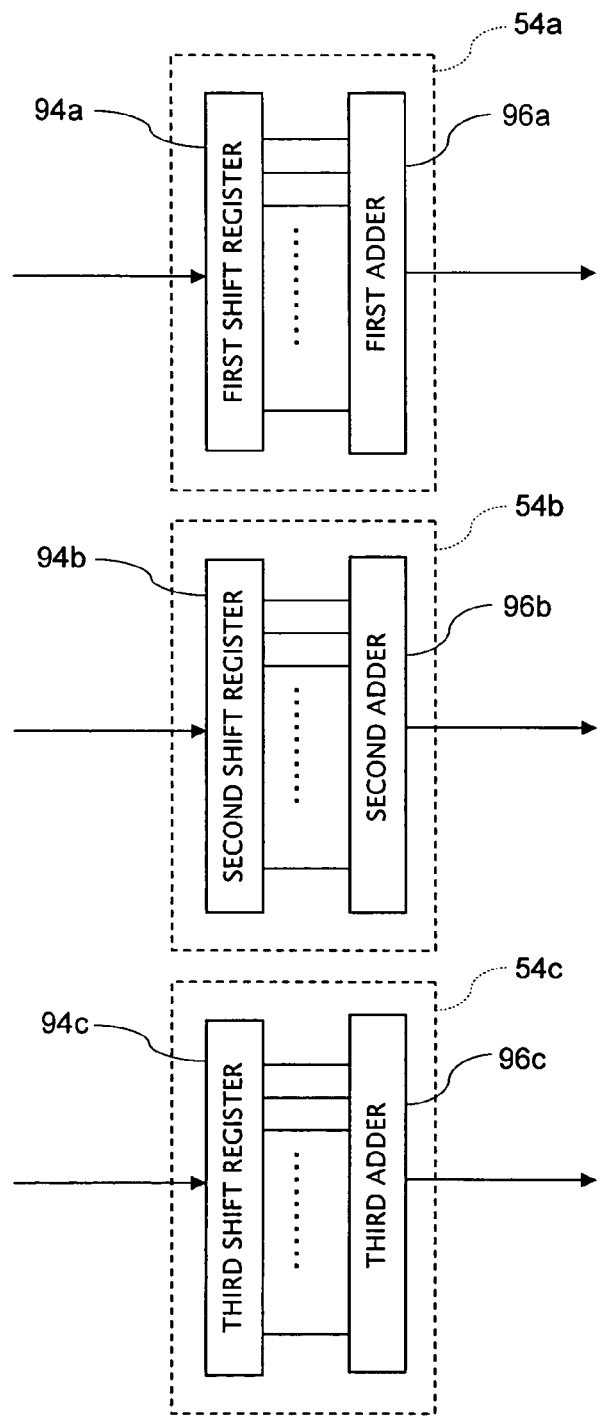
FIG. 12 is a block diagram showing the detailed configuration of a counter.

FIG. 12 is a drawing showing the specific configuration of each of the counters 54. Each of the counters 54 is formed from a shift register 94 and an adder 96. The shift register 94 is set to 19 steps and shifted up every carrier period. The reason why the shift register 94 is set to 19 steps is because 19 corresponds to the minimum number of continual wobble waveforms of the same pattern. Specifically, in the Blu-ray disk, 19 carrier periods over which the monotone wobble waveform is continual corresponds to the minimum number of continual wobble waveforms of the same pattern. When the number of steps of the shift register exceeds 19 steps, the number of shits held in the shift register exceeds the maximum number of continual monotone wobble waveforms. As a result, the HMW[1] period and the HMW[0] period cannot be accurately counted in accordance with the frequency of occurrence to be described later. When the number of steps has become smaller than 19, detection of the HMW[1] period and the HMW[0] period is susceptible to the influence of an erroneously-demodulated component, which again deteriorates the accuracy of HMW detection. Consequently, the number of shift registers is desirably set to 19. As a matter of course, when the shift register is applied to an optical disk other than the Blu-ray disk, the number of steps of the shift register may be changed, as required, in accordance with the address format of an individual optical disk. An output from each step of the shift register 94 is delivered and added to the adder 96 provided in response to the shift register 94. Each of the adders 96 outputs the number of times an individual data value arose in the 19 carrier periods in the past.

Turning back to FIG. 3, the flow of a signal will now be described. Outputs from the counters 54a to 54c are input to the comparators 56 and the AND circuits 60. The comparators 56 and the AND circuits 60 act as HMW detection signal generation means for generating an HMW detection signal from a result of comparison between the frequencies of appearance of respective patterns. The comparators 56a to 56c compare with each other the number of times the HMW [1] wobble waveform, the monotone wobble waveform, and the HMW[0] wobble waveform have arisen, which are detected by the counters 54a to 54c. The first comparator 56a compares the number of times the HMW[1] wobble waveform has arisen (a signal A) with the number of times the monotone wobble waveform has arisen (a signal B). When the former is greater than or equal to the latter, the first comparator 56a outputs a High signal. The second comparator 56b compares the number of times the HMW[1] wobble waveform has arisen (the signal A) with the number of times the HMW[0] wobble waveform has arisen (a signal C). When the former is greater than or equal to the latter, the second comparator 56b outputs a High signal. The third comparator 56c compares the number of times the HMW[0] wobble waveform has arisen (the signal C) with the number of times the monotone wobble waveform has arisen (the signal B). When the former is greater than or equal to the latter, the third comparator 56c outputs a High signal. A hysteresis comparator is preferably used as the comparator 56.

The outputs from the comparators 56a to 56c are input to the first AND circuit 60a and the second AND circuit 60b, where logical AND products of the respective outputs are computed. Specifically, the first AND circuit 60a computes a logical AND product between a signal (a signal D) output from the first comparator 56a and a signal (a signal E) output from the second comparator 56b. The second AND circuit 60b computes a logical AND product between an inverted signal of the signal (the signal E) output from the second comparator 56b and a signal (a signal F) output from the third comparator 56c. A signal G output from the first AND circuit 60a is supplied to the decoder 50 as a signal used for detecting an HMW[1] wobble waveform (hereinafter often called an "HMW detection signal G"), and a signal G output from the second AND circuit 60b is supplied to the decoder 50 as a signal used for detecting an HMW[0] wobble waveform (hereinafter often called an "HMW detection signal H"). As will be described in detail later, the HMW detection signals G, H output from the first and second AND circuits 60a, 60b are susceptible to the reduced influence of erroneous demodulation performed in the HMW detection section. For this reason, the decoder can stably decode an address from the HMW detection signals G, H.

The HMW detection signals G, H output from the AND circuits 60a, 60b are supplied to the HMW sync detection section 62, as well. The HMW sync detection section 62 generates a sync signal from the HMW detection signals. Specifically, the HMW sync detection section 62 computes a logical AND product of the HMW detection signals G, H, and supplies a thus-produced logical AND signal K to a PLL circuit 65, thereby generating a sync clock signal (a signal L) synchronized with the ADIP unit. A position signal M pertaining to a non-modulation section; namely, a section of eight ADIP units that have not been HMW-modulated, is also generated from the logical AND product between the HMW detection signals G, H and the sync clock signal. The thus-generated sync clock signal L and the position signal M pertaining to the non-modulation section are supplied, as sync signals, to the selector 48. Thus, as a result of provision of the HMW sync detection section that generates sync signals from the HMW detection signals, a sync signal can be acquired even when MSK demodulation has ended in failure.

The selector 48 outputs in a prioritized manner either the sync signal generated from the MSK detection signal or the sync signal generated from the HMW detection signal. When a sync signal to be output has not been acquired, the other sync signal is output. The sync signal output from the selector 48 is supplied to the decoder 50, where the signal is utilized for decoding data.

Figure 13:
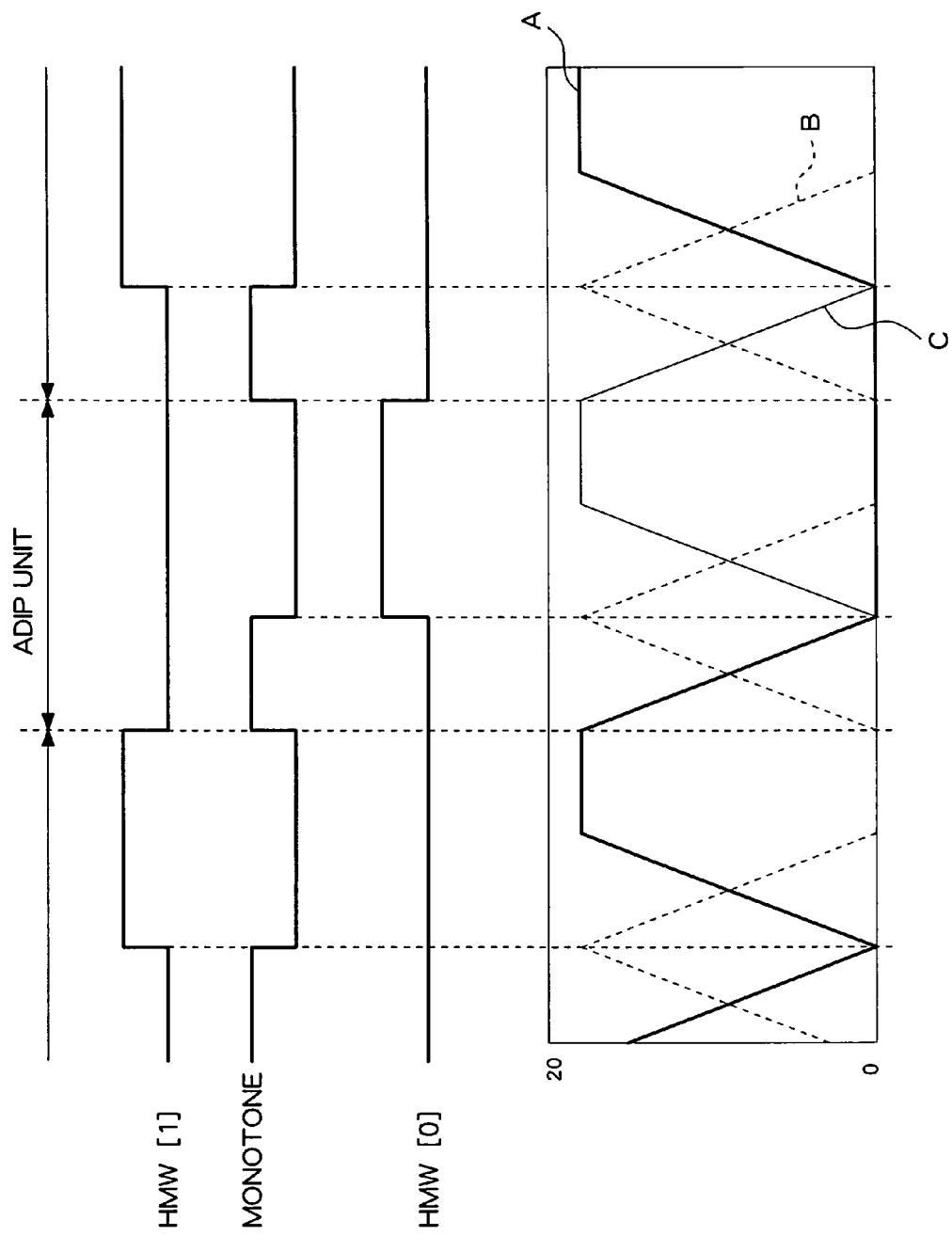
FIG. 13 is a view showing a provisional detection signal and a counter output signal.

The flow of processing performed after HMW demodulation in the present embodiment will now be described by reference to the drawings. FIG. 13 is a view showing a detection signal output from the HMW detection section and the signals A to C output from the counters 54. FIG. 13 illustrates the case of an input of a wobble signal in which an ADIP unit represents a value of {1, 0, 1}. For the sake of convenience of explanation, the HMW detection section 52 is assumed to have caused no erroneous demodulation.

The HMW detection section 52 demodulates a wobble signal, thereby outputting tentative signals for detecting an HMW[1] wobble waveform, an HMW[0] wobble waveform, and a monotone wobble waveform. These tentative detection signals exhibit waveforms such as those illustrated in an upper row of FIG. 13.

The respective tentative detection signals output from the HMW detection section 52 are input to the counters 54, where there are counted the number of times the HMW[1] wobble waveform arose over the 19 carrier periods in the past, the number of times the HMW[0] wobble waveform arose over the 19 carrier periods in the past, and the number of times the monotone wobble waveform arose over the 19 carrier periods in the past. The waveforms of the signals output from the counters 54 are as illustrated in a lower row of FIG. 13. In the drawing, the signal A (representing the number of times the HMW[1] wobble waveform has arisen) output from the first counter 54a is designated by a bold solid line; the signal B (representing the number of times the monotone wobble waveform has arisen) output from the second counter 54b is designated by a fine solid line; and the signal C (representing the number of times the HMW[0] wobble waveform has arisen) output from the third counter 54c is designated by a broken line.

As is obvious from FIG. 13, a delay equal to the number of shift registers exists, but the signal A is understood to show a peak in the ADIP unit of the digital data value 1, and the signal C is understood to show a peak in the ADIP unit of the digital data value 0. Further, a peak of the signal B is understood to appear between the peak of the signal A and the peak of the signal C.

Figure 14:
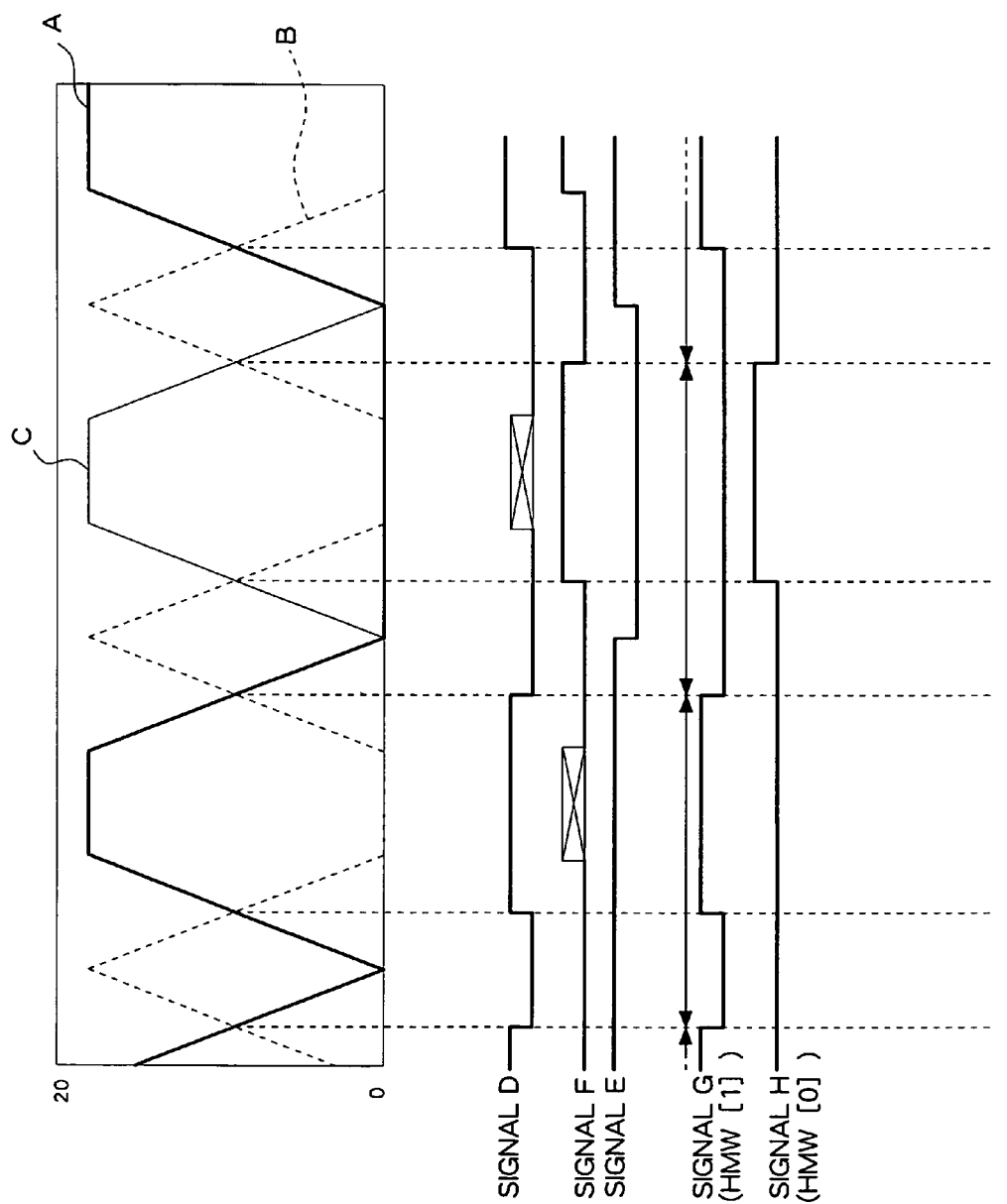
FIG. 14 is a view showing signals output from a counter, a comparator, and an AND circuit.

Subsequently, results of comparison of the signals A to C performed by the comparators 56 are as illustrated in FIG. 14. The previously-described signals A to C are shown in an upper row of FIG. 14, and signals D to H output from the comparators 56 and the AND circuits 60 are shown in a lower row of FIG. 14.

The first comparator 56a compares the signal A (representing the number of times the HMW[1] wobble waveform has arisen) with the signal B (representing the number of times the monotone wobble waveform has arisen). When the signal A is greater, the first comparator 56a outputs a signal D which is to become high. The second comparator 56b compares the signal A (representing the number of times the HMW[1] wobble waveform has arisen) with the signal C (representing the number of times the HMW[0] wobble waveform has arisen). When the signal A is greater, the second comparator 56b outputs a signal E which is to become high. The third comparator 56c compares the signal C (representing the number of times the HMW[0] wobble waveform has arisen) with the signal B (representing the number of times the monotone wobble waveform has arisen). When the signal C is greater, the third comparator 56c outputs a signal F which is to become high.

The signals D and E are supplied to the first AND circuit 60a, and a logical AND product between the signals is output as a signal G. As is evident from FIG. 14, the signal G becomes a signal showing a section during which the number of times the HMW[1] wobble waveform arises becomes greater than the number of times the HMW[0] wobble waveform and the monotone wobble waveform arise. This signal H can be handled as a signal showing an HMW modulation section (corresponding to the 38 carrier period of the latter half) of the ADIP unit showing a digital data value of one and, by extension, can be handled as a signal used for detecting the HMW[1] wobble waveform (i.e., the HMW[1] detection signal).

An inverted signal of the signal D and the signal E are supplied to the second AND circuit 60b. A logical AND product between the inverted signal and the signal E is output as the signal H. As is evident from FIG. 14, the signal H shows a section during which the number of times the HMW[0] wobble waveform arises is greater than the number of times the HMW[1] wobble waveform and the monotone wobble waveform arise. The signal H can be handled as a signal showing the HMW modulation section (the 38 carrier periods of the latter half) of the ADIP unit showing the digital data value of 0 and, by extension, can be handled as a signal for detecting an HMW[0] wobble waveform (i.e., the HMW[0] detection signal).

Therefore, the signal G output from the comparator 60a and the signal H output from the comparator 60b are supplied as an HMW[1] detection signal and an HMW[0] detection signal to the decoder 50. In accordance with these signals, the decoder 50 determines the digital data value of each of the ADIP units.

Figure 15:
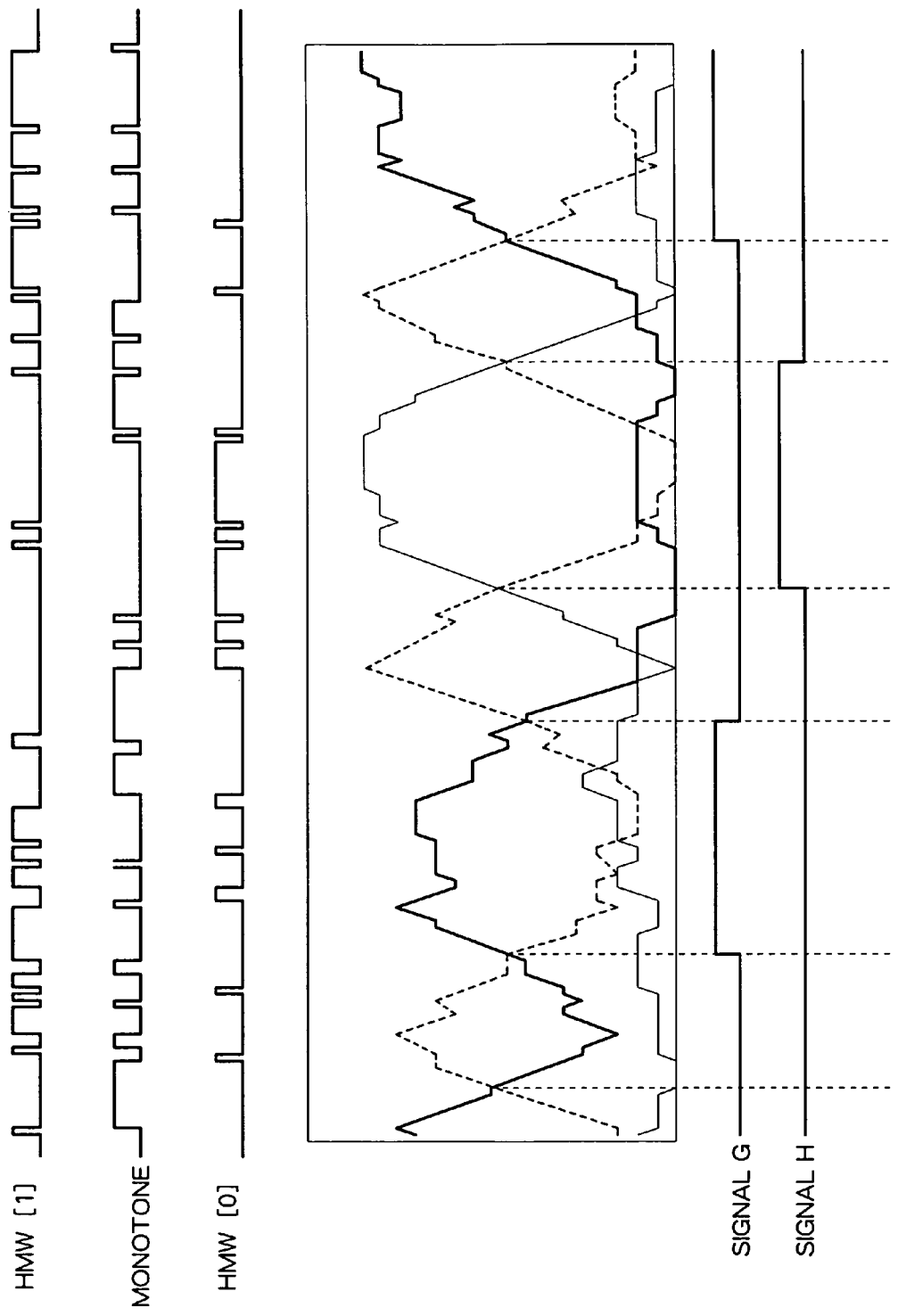
FIG. 15 is a view showing generation of an HMW detection signal performed when erroneous demodulation has arisen.

A case where erroneous demodulation has arisen in the HMW detection section 52 under the influence of noise or the like will now be described, by reference to FIG. 15. FIG. 15 is a view showing the tentative detection signal output from the HMW detection section 52, the signals A to C output from the counters 54, and the signals G, H output from the AND circuits 60.

The wobble signal input to the HMW detection section 52 in FIG. 15 is the same as that input in the case shown in FIGS. 13 and 14. However, when the HMW detection section 52 has failed to perform accurate demodulation under the influence of noise or the like, there may arise a case where a tentative detection signal—in which a single pulse attributable to erroneous demodulation arises—is output, as shown in an upper row of FIG. 15. In the related art, such a tentative detection signal in which many single pulses arise is also supplied directly to the decoder 50. However, difficulty is encountered in determining a digital data value of each of the ADIP units from such a tentative detection signal including excessive erroneous demodulation components; and, by extension, highly-reliable decoding of an address cannot be performed.

When such a tentative detection signal including excessive erroneous demodulation components is input to the previously-described first through third counters 54a to 54c, signals A to C such as those illustrated in the middle row of FIG. 15 are obtained. Under the influence of a single pulse attributable to erroneous demodulation, minute fluctuations are iterated in the signals A to C. Rough waveforms of the respective signals are understood to be analogous to the waveforms of the signals A to C in FIG. 13. Specifically, even in the signals A to C acquired from the tentative detection signal including erroneous demodulation components, the signal A shows a peak in the ADIP unit having a digital data value of one, and the signal C shows a peak in the ADIP unit having a digital data value of 0. A peak of the signal B appears between the peak of the signal A and the peak of the signal C.

Waveforms obtained by inputting the signals A to C into the comparators 56 and the AND circuits 60 correspond to the signals G, H shown in FIG. 15. The signals G, H determined from the tentative detection signal including erroneous demodulation components are understood to be essentially identical in waveforms with the signals G, H (the signals G, H in FIG. 14) determined from the tentative detection signal including no erroneous demodulation components. Specifically, erroneous demodulation is performed in the HMW detection section 52, as well. Even when an inaccurate tentative detection signal is output, the influence of an erroneous demodulation component is diminished as a result of the inaccurate tentative detection signal flowing through the counters 54, the comparators 56, and the AND circuits 60, whereby highly-reliable HMW detection signals G, H are understood to be obtained. As a result of such highly-reliable HMW detection signals G, H being supplied to the decoder 50, the reliability of address decoding operation can be enhanced further.

Figure 16:
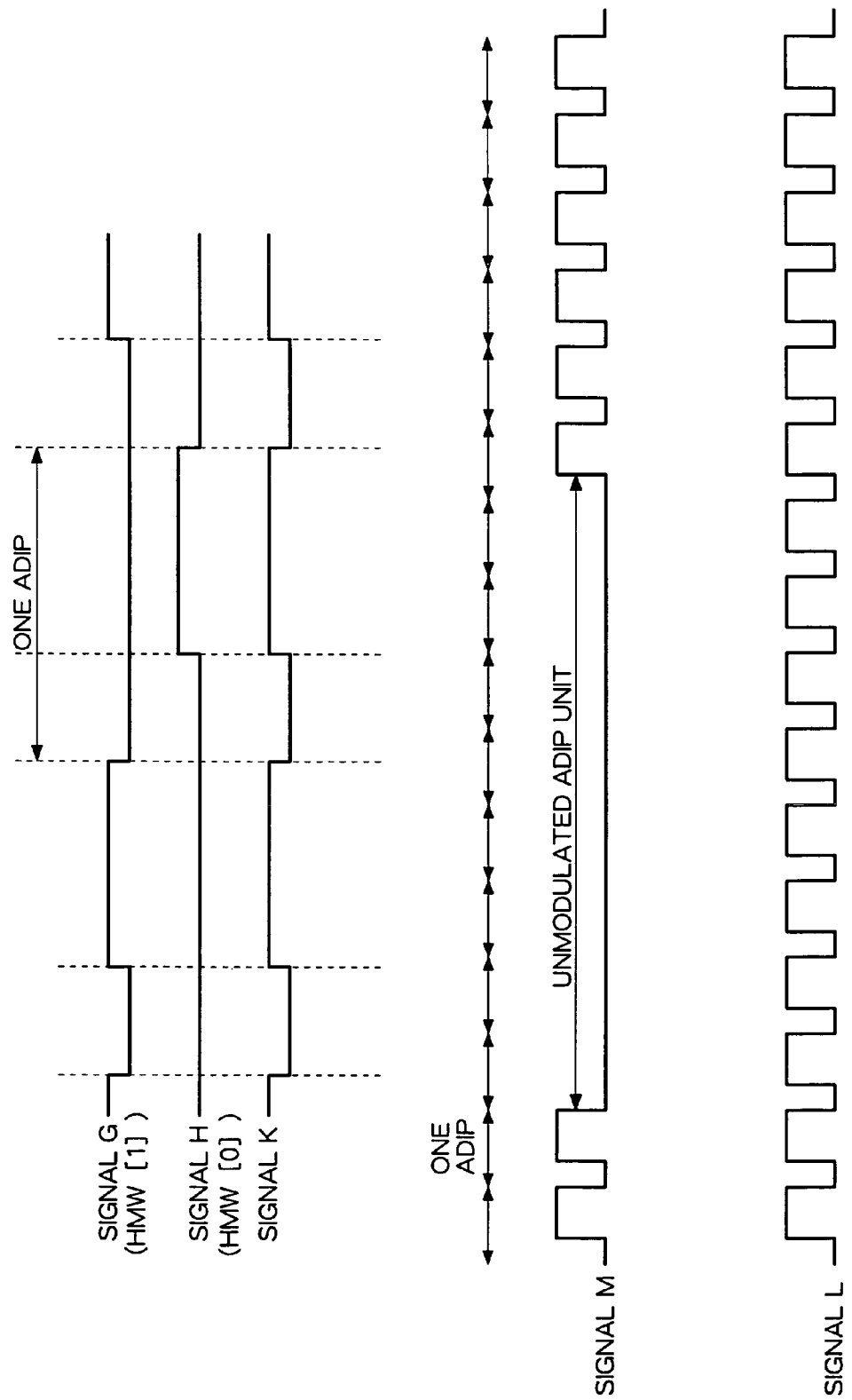
FIG. 16 is a view showing the flow of generation of a sync signal from the HMW detection signal.

The flow of generation of a sync signal from the HMW detection signals G, H will be described by reference to FIG. 16. The HMW detection signals G, H output from the previously-described first, second AND circuits 60a, 60b are input to an OR circuit 64 of the HMW sync detection section 62, where a logical OR product is computed. A logical OR signal K output from the OR circuit 64 is a signal in which a Low portion corresponding to 18 carrier periods and a High portion corresponding to 38 carrier periods are iterated. Put another way, the logical OR signal K has the same period as that of one ADIP. This logical OR signal K is supplied to the PLL circuit 65. The PLL circuit 65 detects an edge component from the input logical OR signal K, and outputs a clock signal L synchronized with the ADIP unit. This clock signal L is utilized for decoding an ADIP unit as in the case of the clock signal generated from the MSK demodulation signal.

The logical OR signal K and the clock signal L are supplied to a non-modulation section detection section 66 as well. The non-modulation section detection section 66 synchronizes the logical OR signal K to the clock signal L, to thus generate a signal M. This signal M is for detecting a non-modulation section and utilized for decoding an ADIP word. The sync signal output from the HMW sync detection section 62 is delayed by the amount corresponding to the number of steps of the shift register. The decoder 50 decodes an address in consideration of the amount of delay.

Specifically, in the present embodiment, the sync signal is produced from the HMW detection signal, as well. Therefore, even when MSK demodulation cannot be performed under the influence of a wobble shift or crosstalk, a sync signal can be acquired. Consequently, highly-reliable decoding of an address becomes feasible.

As is obvious from the above descriptions, a modulated component is enhanced by means of the BPF in the present embodiment, and hence the modulated component is less susceptible to the influence of crosstalk or variations in manufacture of an optical disk, and a modulated signal can be demodulated more accurately. Further, the overall configuration of the demodulation section can be simplified.

According to the present embodiment, the frequency of occurrence of the HMW[0] wobble waveform, the frequency of occurrence of the HMW[1] wobble waveform, and the frequency of occurrence of the monotone wobble waveform are counted. The area where the frequency of occurrence of the HMW[0] wobble waveform becomes maximum is detected and taken as the HMW[0] detection signal, or the area where the frequency of occurrence of the HMW[1] wobble waveform becomes maximum is detected and taken as the HMW[1] detection signal. As a result, the influence of a single pulse resulting from erroneous demodulation can be diminished, and an HMW detection signal which is easy to handle during decoding operation can be obtained. Moreover, the sync signal is generated from the HMW detection signal whose influence of erroneous demodulation has been reduced. Hence, even when MSK demodulation cannot be performed, address data can be decoded stably.

Although the present embodiment describes a Blu-ray disk as an example of the optical disk to be handled, the present invention can be naturally applied to an optical disk of another type, so long as the disk has a wobble which represents one bit of data to be modulated by means of making HMW modulated wobbles—showing a single digital value—continual over a plurality of periods.

Figure 17:
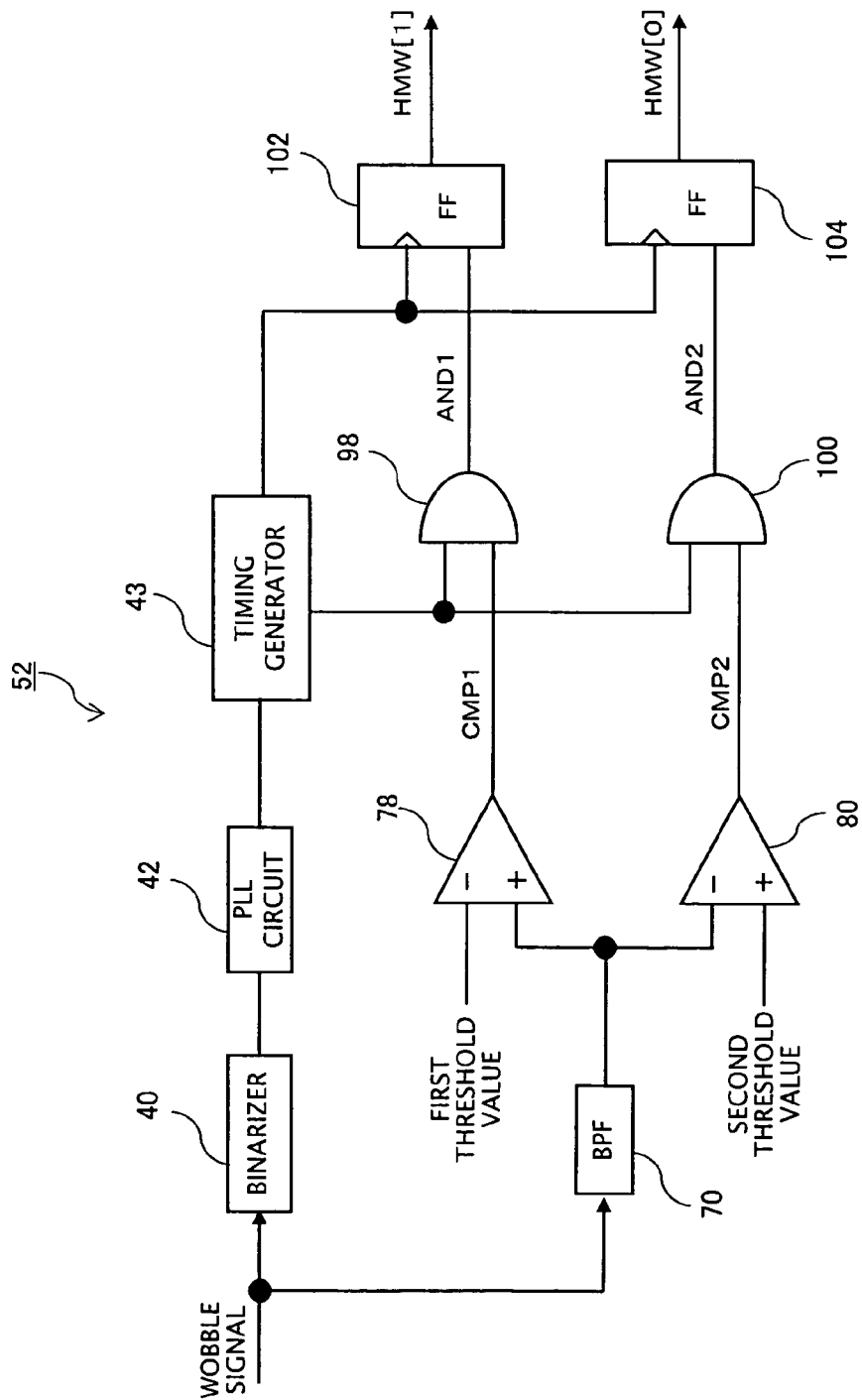
FIG. 17 is a block diagram showing the configuration of the HMW detection section of another embodiment of the present invention.

Another embodiment of the present invention will now be described by reference to FIG. 17. FIG. 17 shows a block diagram showing the configuration of the HMW detection section 52 of the present embodiment. The HMW detection section enables reliable HMW demodulation without provision of a multiplier. A multiplier for multiplying a wobble signal by a second harmonic waveform signal is indispensable for a conventional HMW demodulation circuit. However, the multiplier is bulky and expensive. For this reason, scale-up and cost hike of the entire demodulation circuit cannot be avoided. In order to solve the drawback, the present embodiment is configured so as to be able to effect HMW demodulation without utilization of a multiplier. The HMW detection section 52 will be described in detail hereunder.

As in the case of the previously-described HMW demodulation section, the reproduced wobble signal is input to the HMW detection section 52 and the BPF 70. After having binarinized the wobble signal, the binarizer 40 outputs the binarized signal to the PLL circuit 42. The PLL circuit 42 detects an edge component from the input, binarized wobble signal, thereby generating a wobble clock signal synchronized with the reference carrier signal $\{\cos(\omega t)\}$. The thus-generated wobble clock signal is supplied to the timing generator 43. The timing generator 43 generates, from the wobble clock signal, a second harmonic signal $\{\sin(2\omega t)\}$ and a fourth harmonic signal $\{\sin(4\omega t)\}$. The second harmonic signal is supplied to AND circuits 98, 100 to be described later, and the fourth harmonic signal is supplied to flip-flop circuits (hereinafter called "FF circuits") 102, 104.

As in the case of the previously-described embodiment, the BPF 70 acts as extraction means for extracting a second harmonic signal from a wobble signal, and the frequency characteristic of the BPF 70 is as illustrated in FIG. 5. As a result of passing through this BPF 70, the wobble signal becomes a signal whose second harmonic component has been enhanced. The signal having passed through the BPF is supplied to the first comparator 78 along with a first preset threshold value, as well as being supplied to the second comparator 80 along with a second preset threshold value, whereby the signal is discriminated from the respective threshold values. The two signals having been discriminated from the threshold values are supplied to a first AND circuit 98 and a second AND circuit 100, respectively, where a logical AND product between a second harmonic signal and the discriminated signal is computed. A signal output from the AND circuit 98 is supplied to an FF circuit 102 along with a fourth harmonic signal output from the timing generator, and a signal output from the AND circuit 100 is supplied to an FF circuit 104 along with the fourth harmonic signal. A signal output from the first FF circuit 102—into which the signal output from the first AND circuit 98 and the fourth harmonic signal are input—becomes the HMW[1] detection signal. A signal output from the second FF circuit 104—into which a signal output from the second AND circuit 100 and the fourth harmonic signal are input—becomes the HMW[0] detection signal.

Figure 18:
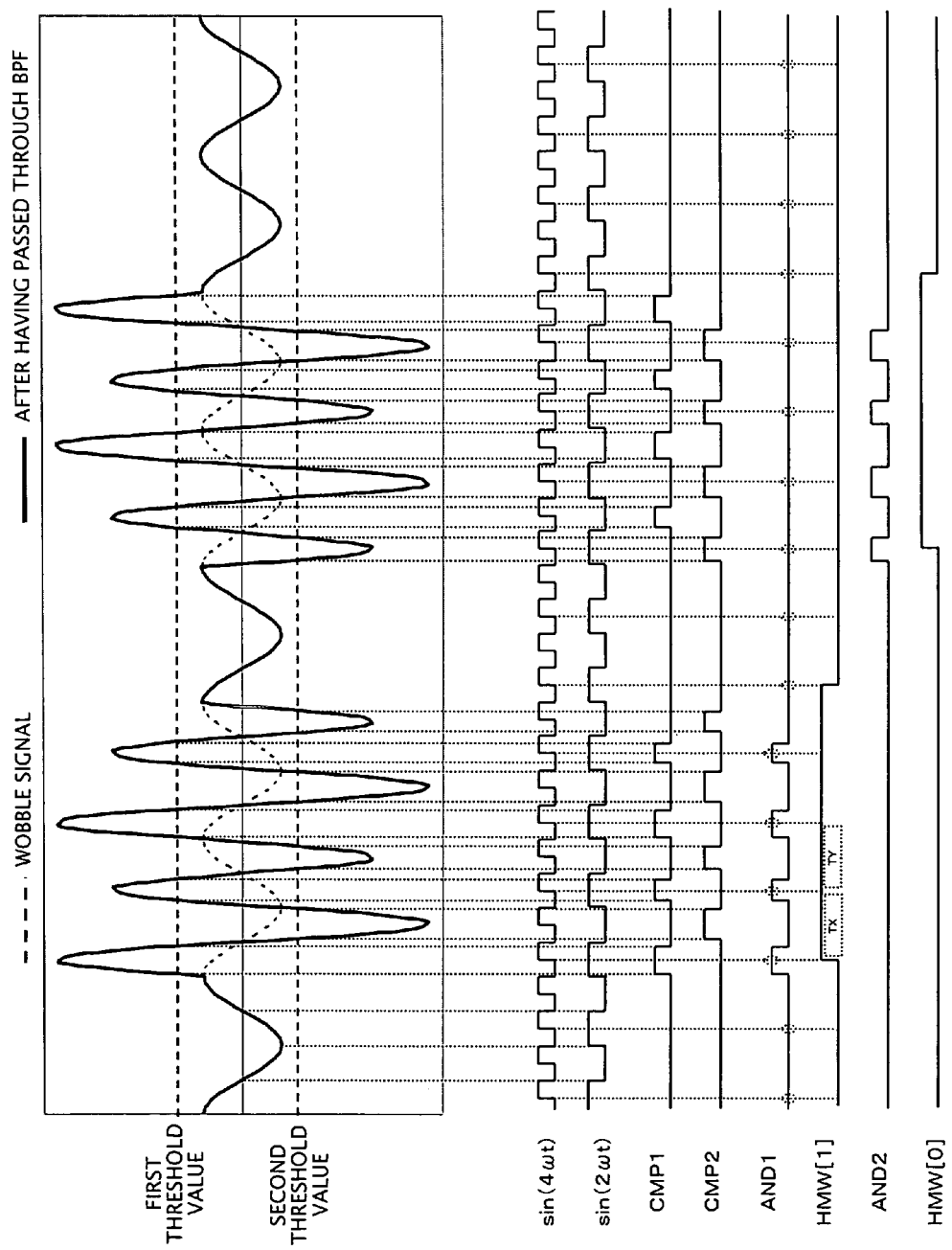
FIG. 18 is a view showing detection of an HMW signal.

The flow of HMW demodulation performed by the HMW detection section 52 will now be described by reference to the drawings. FIG. 18 is a view showing signal waveforms acquired in the process of HMW demodulation. As a result of passing through the BPF, a wobble signal indicated by a broken line assumes a waveform whose second harmonic component has been enhanced. The signal having passed through the BPF is discriminated from the first preset threshold value and the second preset threshold value. Specifically, the first comparator 78 produces an output CMP1 in which a portion greater than the first threshold value is taken as Low, and the other portion, which is less than the first threshold value, is taken as High. The second comparator 80 produces an output CMP2 in which a portion less than the second threshold value is taken as High, and the other portion, which is greater than the second threshold value, is taken as Low.

The two types of signals CMP1, CMP2 acquired by means of discriminating the wobble signal from the threshold values are supplied to the first AND circuit 98 and the second AND circuit 100, respectively. The first AND circuit 98 computes a logical AND product 1 from the signal CMP1 output from the first comparator 78 and the second harmonic signal. The second AND circuit 100 computes a logical AND product 2 from the signal CMP2 output from the second comparator 80 and the second harmonic signal. The signal AND1 output from the first AND circuit 98 and the fourth harmonic signal are input to the first FF circuit 102, and the first FF circuit 102 outputs a signal corresponding to the combination of values of the signals. The signal output from the first FF circuit 102 becomes the HMW[1] detection signal. A signal AND2 output from the second AND circuit 100 and the fourth harmonic signal are input to the second FF circuit 104, and the second FF circuit 104 outputs a signal corresponding to the combination of values of the signals. The signal output from the second FF circuit 104 becomes the HMW[0] detection signal. The first FF circuit 102 makes two determinations; namely, a determination of a TX section and a determination of a TY section, both the TX and TY sections being shown in FIG. 18, during the reference carrier period (one wobble waveform). When the respective determinations are made, four types of combinations of signals input to the first FF circuit 102 are conceivable. Namely, the four conceivable types of combinations of the CMP1 signal and the fourth harmonic signal are Low-Low, Low-High, High-Low, and High-High. Of the four types of combinations, determining any of the combinations as HMW[1] may be altered, as required. For instance, in the case of Low-High and High-Low as well as High-High, the combination may also be deemed as HMW[1]. Moreover, a criterion may be altered between normal times and a retry for an error. For example, in normal times, only the combination of High-High may be determined as a HMW[1] wobble waveform. At the time of an error retry, both the combination of Low-High and the combination of High-Low may also be determined as a HMW[1] wobble waveform.

As is evident from the above descriptions, in the present embodiment, the second harmonic component is enhanced by the BPF 70. Therefore, so long as the wobble signal having passed through the BPF is directly discriminated from the threshold value, a harmonic component portion can be selected. Put another way, the harmonic component portion can be selected without involvement of multiplication. Subsequently, a logical AND product is computed from the signal discriminated from the threshold value and the second harmonic signal, thereby determining the value of a selected harmonic component. Finally, the fourth harmonic signal and the logical AND product are input to the FF circuits 102, 104, thereby enabling detection of the HMW[1] portion and the HMW[0] portion. Specifically, in the present embodiment, HMW demodulation can be performed reliably without use of a multiplier.

Figure 19:
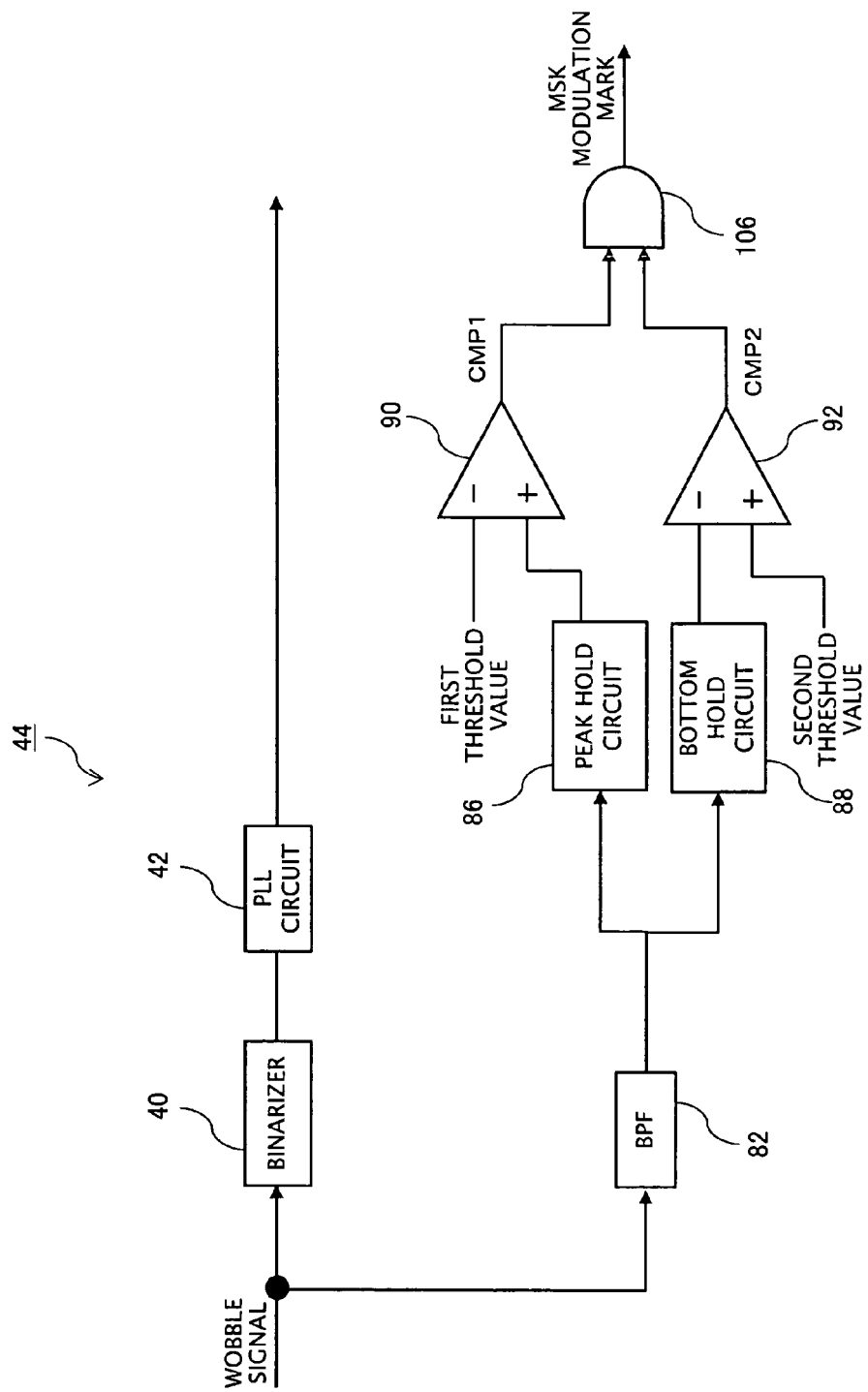
FIG. 19 is a block diagram showing the configuration of the MSK detection section of still another embodiment of the present invention.

The MSK detection section 44 of another embodiment will now be described by reference to the drawings. FIG. 19 is a view showing the detailed configuration of the MSK detection section 44 of the other embodiment. This MSK detection section 44 is also configured without use of a multiplier.

In this MSK detection section 44, the reproduced wobble signal is input to the binarizer 40 and the BPF 82, as in the case of the previously-described MSK detection section. After having binarized the wobble signal, the binarizer 40 outputs the binarized wobble signal to the PLL circuit 42. The PLL circuit 42 detects an edge component from the input binarized wobble signal, thereby generating a wobble clock signal synchronized with the reference carrier signal {cos(ωt) }. The thus-generated wobble clock signal is output to the decoding section, where the clock signal is utilized for decoding digital data.

As in the case of the previously-described MSK detection section, the BPF 82 acts as extraction means for extracting, from the wobble signal, a frequency component which is 1.5 times the reference frequency fwob. The center frequency of the BPF 82 is set to 1.5 fwob. As a result of having passed through the BPF 82, the wobble signal becomes a signal having an enhanced 1.5 fwob frequency component. The signal having passed through the BPF is input directly to the peak hold circuit 86 and the bottom hold circuit 88 without involvement of multiplication, whereby envelope signals of the wobble signal are detected. The thus-detected peak envelope signal is input to the first comparator 90 along with the preset first threshold value, where the signal is discriminated from the threshold value. The bottom envelop signal is also input to the second comparator 92 along with the preset second threshold value, where the signal is discriminated from the threshold value. The two signals having been discriminated from the threshold values are supplied to an AND circuit 106, where an AND product is computed from the two signals. A signal output from the AND circuit 106 becomes a signal used for detecting an MSK modulation mark.

Figure 20:
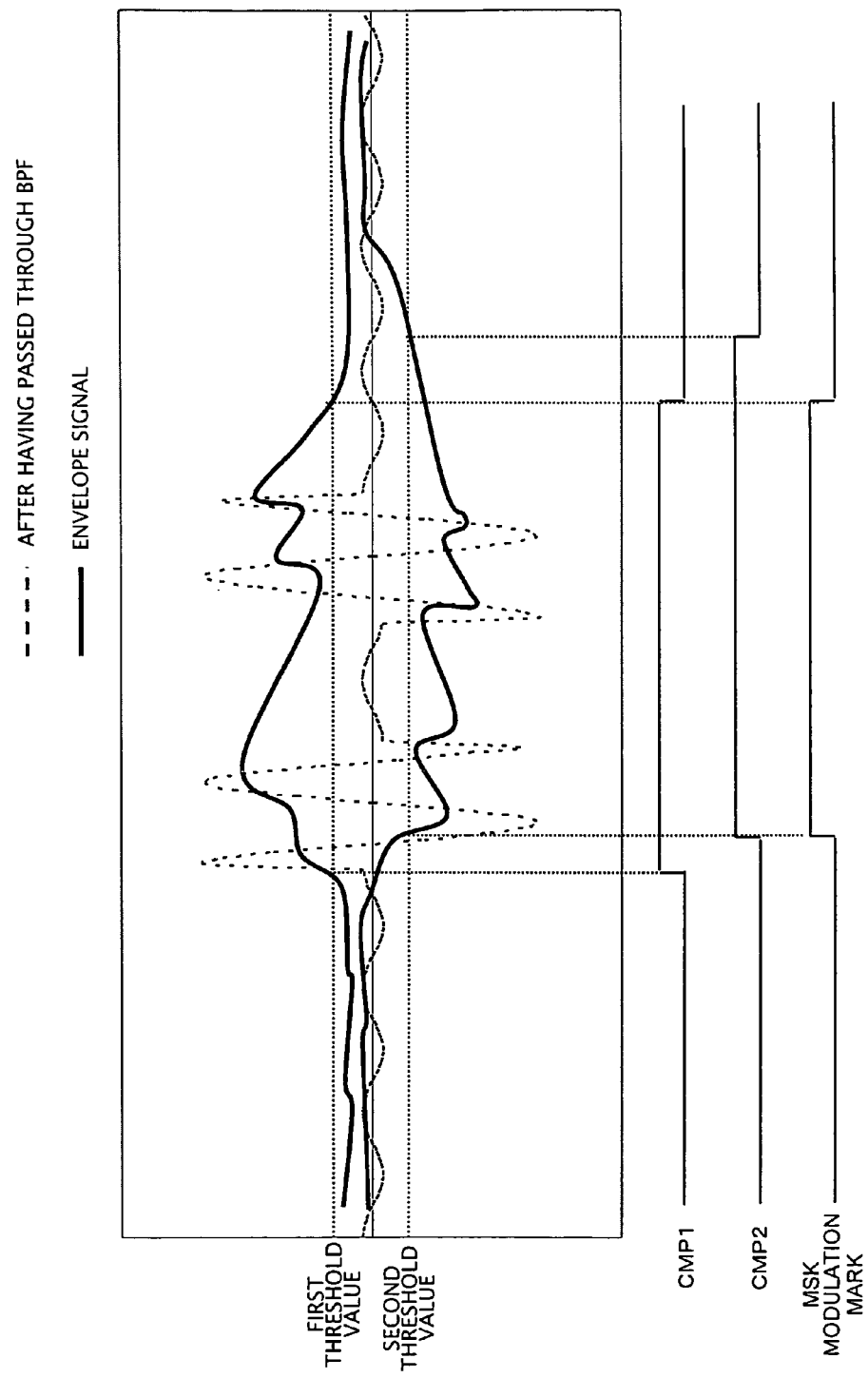
FIG. 20 is a view showing detection of MSK modulation marks.

Next, the flow of MSK demodulation performed by the MSK detection section 44 will be described by reference to the drawings. FIG. 20 is a view showing a signal waveform acquired through the process of MSK demodulation. In FIG. 20, a broken line denotes a wobble signal having passed through a BPF, and a solid line denotes an envelope signal of this wobble signal. The first comparator 90 compares the peak envelope with the first threshold value. When the peak envelope value is the greater than or equal to first threshold value, the first comparator 90 outputs the signal CMP1 which becomes High. When the peak envelope value is less than the first threshold value, the first comparator 90 outputs the signal CMP1 which becomes Low. The second comparator 92 compares the bottom envelope with the second threshold value. When the bottom envelope value is less than the second threshold value, the second comparator 92 outputs the signal CMP2 which becomes High. When the bottom envelope value is greater than or equal to the second threshold value, the second comparator 92 outputs the signal CMP2 which becomes Low. The AND circuit 106 computes a logical AND product from the two types of the signals CMP1, CMP2 which have been discriminated from the threshold values, whereby a signal showing an MSK modulation mark is obtained.

As is evident from the above descriptions, in the present embodiment, the BPF 82 enhances the MSK modulation component. Therefore, the start position and the end position of the MSK modulation mark can be detected, so long as the wobble signal having passed through the BPF is subjected directly to detection of envelopes and discrimination from threshold values. The MSK modulation mark can be detected by means of generating a logical AND product of the two signals that have been discriminated from the threshold values. In short, in the present embodiment, MSK demodulation can be performed thoroughly by means of a simple configuration without use of a multiplier.

Even in the present embodiment, an equalizer or the like may also be used in lieu of the BPF, so long as the equalizer can enhance the second harmonic component or the 1.5 fwob frequency component so as to become greater than the reference frequency component and output the thus-enhanced component. The first threshold value and the second threshold value may be set in accordance with the wobble signal having passed through the BPF or an error rate.

The apparatus of the present embodiment is a demodulator which demodulates digital data embedded in the wobble signal from the wobble signal which represents one bit of data to be modulated by means of making HMW-modulated wobbles—showing a single digital value—continual over a plurality of periods. The apparatus comprises detection means for demodulating the HMW-modulated wobble signal to thus detect respective patterns, i.e., the HMW[1] pattern, the HMW[0] pattern, and the monotone pattern; frequency computation means for sequentially computing the frequency of generation, from the result of detection made by the detection means, of the HMW[1] wobble waveform, the HMW[0] wobble waveform, and the monotone wobble waveform in a given carrier period; and HMW detection signal generation means for comparing the thus-computed frequencies of generation with each other, to thus generate an HMW[1] detection signal which takes, as an HMW[1] portion, an area where the frequency of generation of the HMW[1] wobble waveform is greater than the frequency of generation of other patterns and an HMW[0] detection signal which takes, as an HMW[0] portion, an area where the frequency of generation of the HMW[0] wobble waveform is greater than the frequency of generation of other patterns.

In this demodulator, the given carrier period is set to the shortest carrier period among a specified carrier period during which the HMW[0] wobble waveforms defined as a data format are continual; a specified carrier period during which the HMW[1] wobble waveforms defined as a data format are continual; and the specified carrier period during which the monotone wobble waveforms defined as a data format are continual.

Moreover, this demodulator further comprises sync signal generation means for generating sync signals from the HMW[1] detection signal and the HMW[0] detection signal, both detection signals having been generated by the HMW detection signal generation means. The sync signal generation means comprises logical OR means for computing a logical OR product from the HMW[1] detection signal and the HMW[0] detection signal, and a sync signal is generated from the thus-acquired logical OR signal.

What is claimed is:

1. A demodulator for demodulating a digital signal from a wobble signal modulated by an HMW modulation scheme or an MSK modulation scheme, the demodulator comprising:
    enhancement means for enhancing a modulated frequency component included in the wobble signal and outputting an enhanced modulated frequency component;
    sync signal generation means for generating, from the wobble signal as a sync signal, a signal of a modulation frequency synchronized with the wobble signal when the wobble signal is modulated by the HMW modulation scheme or a signal of a reference carrier frequency synchronized with the wobble signal when the wobble signal is modulated by the MSK modulation scheme;
    multiplication means for multiplying the generated sync signal by the enhanced wobble signal for generating a non-integrated signal;
    hold means for determining a peak hold signal and a bottom hold signal of the non-integrated signal obtained by multiplication; and
    means for demodulating a digital signal from a result of a comparison of the determined peak hold signal and the determined bottom hold signal with a first preset threshold value and a second preset threshold value.

2. A demodulator for demodulating digital information from a wobble signal modulated by an HMW modulation scheme by means of adding or subtracting an even-order harmonic signal to or from a sinewave carrier signal, the demodulator comprising:
    enhancement means for enhancing a harmonic component included in the wobble signal and outputting an enhanced harmonic component;
    sync signal generation means for generating at least one harmonic signal from a binarized signal of the wobble signal;
    first signal generation means for generating a first signal by means of discriminating the enhanced wobble signal from a first threshold value;
    second signal generation means for generating a second signal by means of discriminating the enhanced wobble signal from a second threshold value; and
    means for computing a logical AND product of the at least one harmonic signal and the first signal and a logical AND product of the at least one harmonic signal and the second signal, thereby demodulating a digital signal from the generated logical AND products.

3. A demodulator for demodulating digital information from a carrier signal of a predetermined frequency and a wobble signal which is MSK-modulated by means of a sinewave signal of a frequency differing from the frequency of the carrier signal, the demodulator comprising:
    enhancement means for enhancing the different frequency component included in the wobble signal and outputting an enhanced non-integrated frequency component signal;
    hold means for determining a peak hold signal and a bottom hold signal of the enhanced non-integrated frequency component signal;
    first signal generation means for generating a first signal by means of discriminating the peak hold signal from a first threshold value;
    second signal generation means for generating a second signal by means of discriminating the bottom hold signal from a second threshold value; and
    means for computing a logical AND product of the first signal and the second signal, wherein a digital signal is demodulated from the obtained AND product.

4. The demodulator according to claim 1, wherein the enhancement means is a bandpass filter set such that a modulation frequency becomes higher in gain than the frequency of a carrier signal.

5. The demodulator according to claim 4, wherein the enhancement means is a bandpass filter set such that the modulation frequency is set to a center frequency.

* * * * *